United States Patent
Arai et al.

(10) Patent No.: US 9,512,960 B2
(45) Date of Patent: Dec. 6, 2016

(54) ROTATIONAL SUPPORT MECHANISM

(71) Applicant: FUJI XEROX CO., LTD., Tokyo (JP)

(72) Inventors: Hiroomi Arai, Yokohama (JP); Shuichi Tanaka, Yokohama (JP); Miho Kamata, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 59 days.

(21) Appl. No.: 14/553,309

(22) Filed: Nov. 25, 2014

(65) Prior Publication Data
US 2015/0226372 A1 Aug. 13, 2015

(30) Foreign Application Priority Data

Feb. 10, 2014  (JP) ................ 2014-023501
Feb. 10, 2014  (JP) ................ 2014-023502
Feb. 10, 2014  (JP) ................ 2014-023503

(51) Int. Cl.
*F16M 11/00* (2006.01)
*F16M 13/02* (2006.01)
*F16M 11/10* (2006.01)
*F16M 11/20* (2006.01)

(52) U.S. Cl.
CPC .............. *F16M 13/02* (2013.01); *F16M 11/10* (2013.01); *F16M 11/2014* (2013.01); *F16M 2200/041* (2013.01)

(58) Field of Classification Search
USPC ............... 248/291.1, 292.13, 917, 919, 921, 923,248/121, 122.1, 278.1
See application file for complete search history.

(56) References Cited

U.S. PATENT DOCUMENTS

| 6,997,422 | B2* | 2/2006 | Sweere | ........... F16M 11/04 248/123.11 |
| 7,306,481 | B2 | 12/2007 | Tsukamoto | |
| 7,413,152 | B1* | 8/2008 | Chen | ........... F16M 11/04 16/233 |
| 8,111,240 | B2 | 2/2012 | Sawada et al. | |

(Continued)

FOREIGN PATENT DOCUMENTS

| JP | H04-061385 U | 5/1992 |
| JP | H05-030538 U | 4/1993 |

(Continued)

OTHER PUBLICATIONS

Oct. 16, 2014 Office Action issued in Japanese Application No. 2014-023502.

(Continued)

*Primary Examiner* — Steven Marsh
(74) *Attorney, Agent, or Firm* — Oliff PLC

(57) ABSTRACT

A rotational support mechanism includes: a fixing member that holds a support subject unit; an inner chassis that supports the fixing member so that the fixing member is rotatable in a vertical plane via a tilt shaft structure that is formed between the fixing member and the inner chassis; an outer chassis that is formed so as to cover the inner chassis from outside; a pedestal that supports the inner chassis and the outer chassis so that the inner chassis and the outer chassis are rotatable in a horizontal plane via a swivel shaft that is formed between a combination of the inner chassis and the outer chassis and the pedestal; and a first rotatable range restricting unit that is detachable and restricts a horizontal rotatable range of the support subject unit.

15 Claims, 25 Drawing Sheets

(56) References Cited

U.S. PATENT DOCUMENTS

| | | | | |
|---|---|---|---|---|
| 9,091,389 B2* | 7/2015 | Wong | ............... | F16M 13/022 |
| 2003/0122046 A1* | 7/2003 | Huong | ............. | E05D 11/087 |
| | | | | 248/291.1 |
| 2006/0292923 A1 | 12/2006 | Tsukamoto | | |
| 2007/0262210 A1* | 11/2007 | Oh | .................... | F16M 11/10 |
| | | | | 248/125.1 |
| 2008/0123131 A1 | 5/2008 | Sawada et al. | | |
| 2009/0008524 A1* | 1/2009 | Huang | ............... | F16M 11/04 |
| | | | | 248/278.1 |
| 2010/0065694 A1* | 3/2010 | Duan | ................. | F16M 11/10 |
| | | | | 248/121 |

FOREIGN PATENT DOCUMENTS

| | | |
|---|---|---|
| JP | H03-063223 U | 10/1999 |
| JP | 3067879 U | 4/2000 |
| JP | 2001-050244 A | 2/2001 |
| JP | 2005-300796 A | 10/2005 |
| JP | 2005-347615 A | 12/2005 |
| JP | 2006-052786 A | 2/2006 |
| JP | 2007-037391 A | 2/2007 |
| JP | 2008-075846 A | 4/2008 |
| JP | 2008-089054 A | 4/2008 |
| JP | 2008-134365 A | 6/2008 |
| JP | 2010-097037 A | 4/2010 |
| JP | 2010-144916 A | 7/2010 |
| JP | 2011-011397 A | 1/2011 |
| JP | 2012-237323 A | 12/2012 |

OTHER PUBLICATIONS

Oct. 23, 2014 Office Action issued in Japanese Application No. 2014-023503.

Aug. 7, 2014 Office Action issued in Japanese Application No. 2014-023501.

* cited by examiner

ROTATIONAL SUPPORT MECHANISM

CROSS-REFERENCE TO RELATED APPLICATIONS

This application is based on and claims priority under 35 USC 119 from Japanese Patent Application No. 2014-023501 filed on Feb. 10, 2014, Japanese Patent Application No. 2014-023502 filed on Feb. 10, 2014 and Japanese Patent Application No. 2014-023503 filed on Feb. 10, 2014.

BACKGROUND

Technical Field

The present invention relates to a rotational support mechanism.

SUMMARY

According to an aspect of the invention, there is provided a rotational support mechanism comprising a fixing member that holds a support subject unit; an inner chassis that supports the fixing member so that the fixing member is rotatable in a vertical plane via a tilt shaft structure that is formed between the fixing member and the inner chassis; an outer chassis that is formed so as to cover the inner chassis from outside; a pedestal that supports the inner chassis and the outer chassis so that they are rotatable in a horizontal plane via a swivel shaft that is formed between a combination of the inner chassis and the outer chassis and the pedestal; and a first rotatable range restricting unit that is detachable and restricts a horizontal rotatable range of the support subject unit.

BRIEF DESCRIPTION OF THE DRAWINGS

Exemplary embodiments of the present invention will be described in detail based on the following figures, wherein.

DESCRIPTION OF SYMBOLS

Figure 1A:
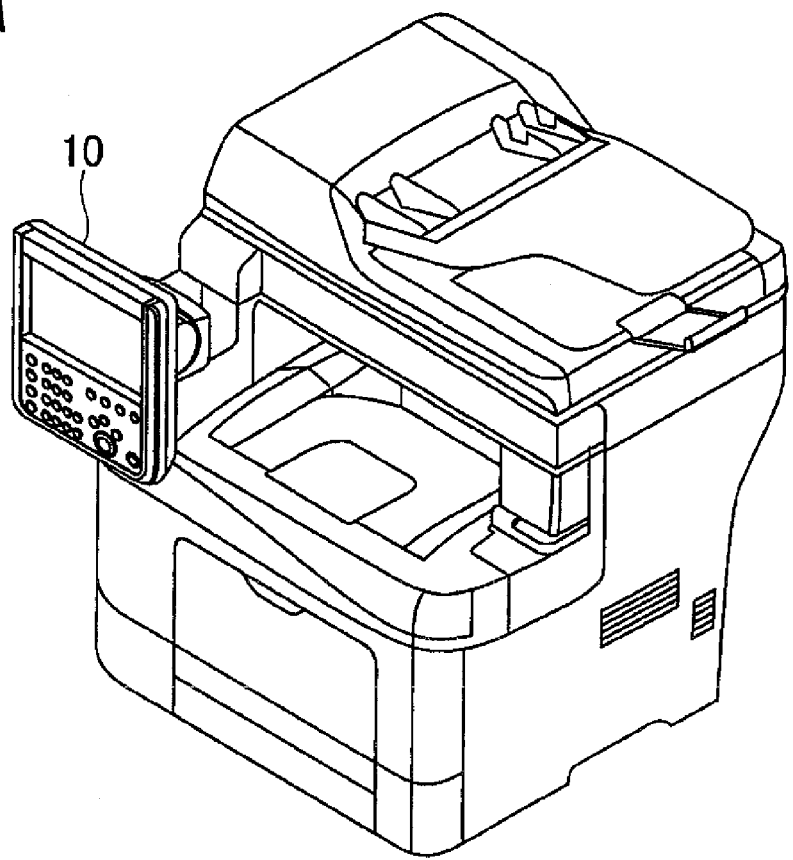
FIGS. 1A and 1B are perspective views showing an appearance of an image forming apparatus in which an operating panel (support subject unit) is supported rotatably using a hinge mechanism (rotational support mechanism) according to an exemplary embodiment of the present invention.

10: Operating panel
20: Wire harness (bundle of cables)
30: Hinge mechanism (rotational support mechanism)
31: Pedestal
31a: Stopper
32: Outer chassis
32a-32d: Projections
33: Inner chassis
33a, 33b: Boss holes
33c, 33d: Screws
34: Rotation stopper
35a, 35b: Panel fixing members
36: Harness guide
37a, 37b: Tilt shaft structures
38: Spring
40: Swivel shaft 42, 43: Rotation shafts
51, 52: Fixing points
53: Front cover

DETAILED DESCRIPTION

An exemplary embodiment of the present invention will be hereinafter described in detail with reference to the drawings.

Figure 1B:
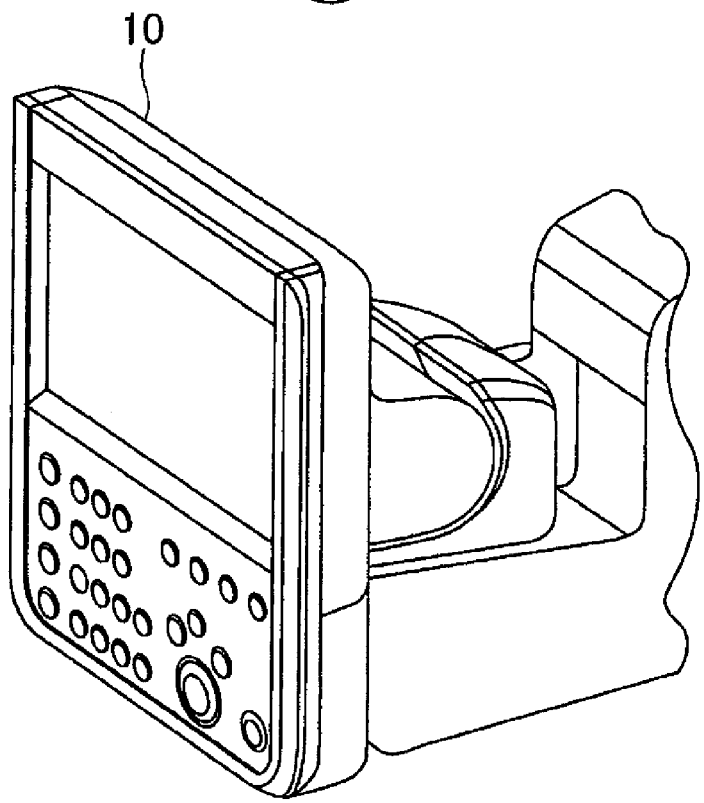

FIGS. 1A and 1B show an appearance of an image forming apparatus in which an operating panel 10 (support subject unit) is supported rotatably using a hinge mechanism (rotational support mechanism) according to the exemplary embodiment of the invention. More specifically, FIG. 1A shows an overall appearance of the image forming apparatus including the operating panel 10. FIG. 1B is an enlarged view of part of FIG. 1A, that is, the operating panel 10 and its neighborhood. The image forming apparatus shown in FIGS. 1A and 1B is an apparatus called a multifunction machine having plural functions such as a printing function, a scanning function, and a copying function, a facsimile function. The operating panel 10 is used for making various manipulations on the image forming apparatus and displaying a state of the image forming apparatus to a user.

Figure 2A:
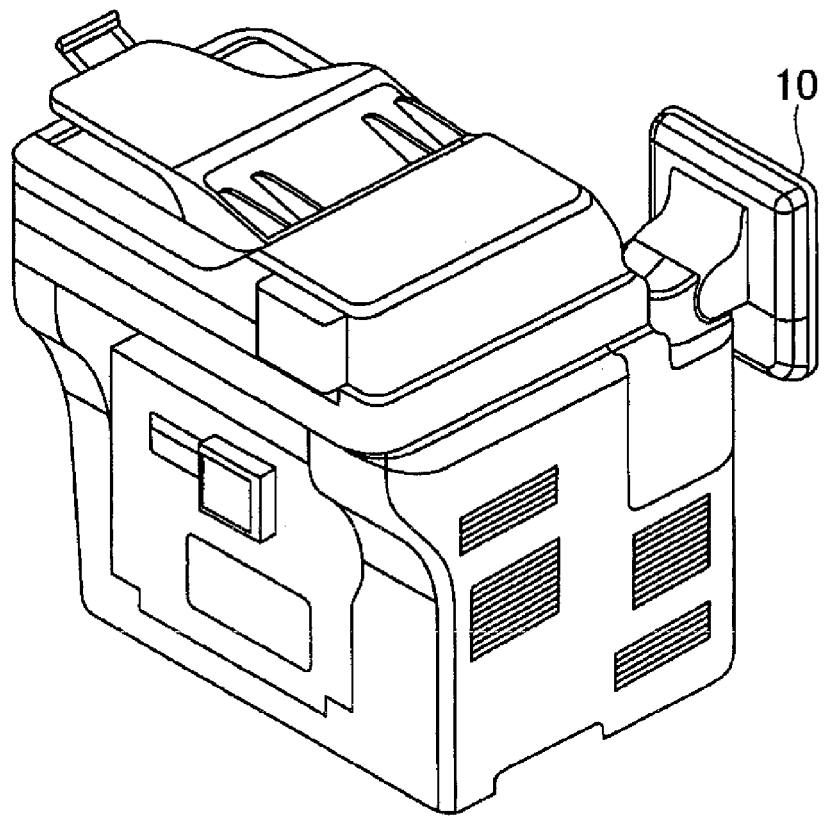
FIGS. 2A and 2B are perspective views showing an appearance, as viewed obliquely from the back side, of the image forming apparatus shown in FIGS. 1A and 1B.
Figure 2B:
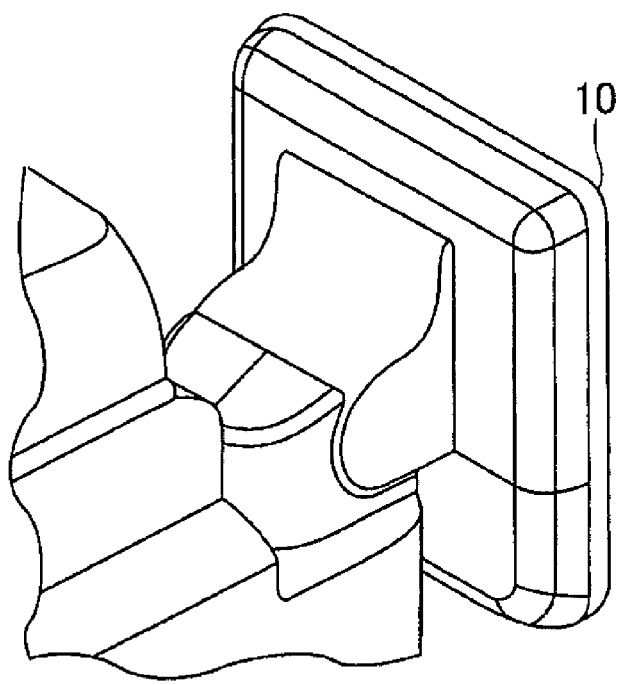

FIGS. 2A and 2B show an appearance, as viewed obliquely from the back side, of the image forming apparatus shown in FIGS. 1A and 1B. More specifically, FIG. 2A shows an overall appearance, as viewed obliquely from the back side, of the image forming apparatus including the operating panel 10. FIG. 2B is an enlarged view of part of FIG. 2A, that is, the operating panel 10 and its neighborhood.

Figure 3:
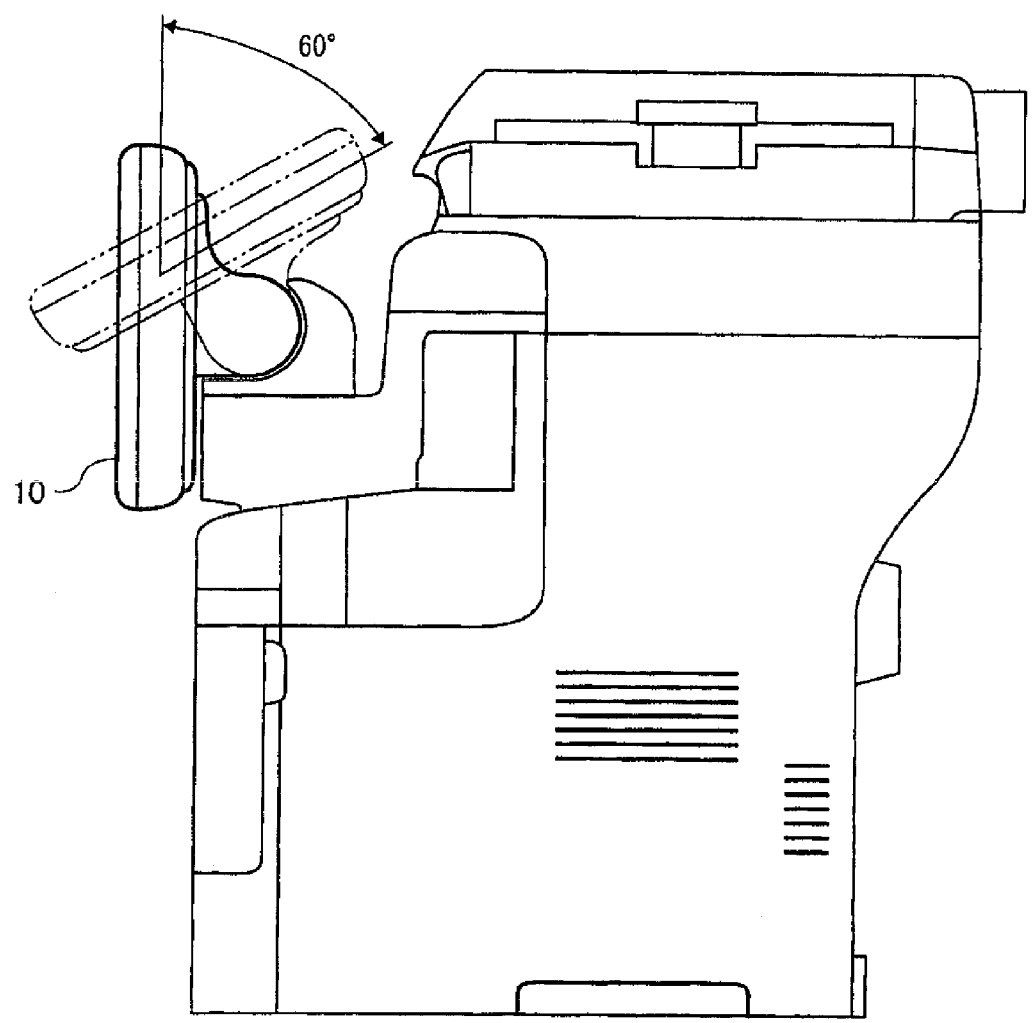
FIG. 3 is a side view showing a vertical rotatable range of the operating panel 10.
Figure 4:
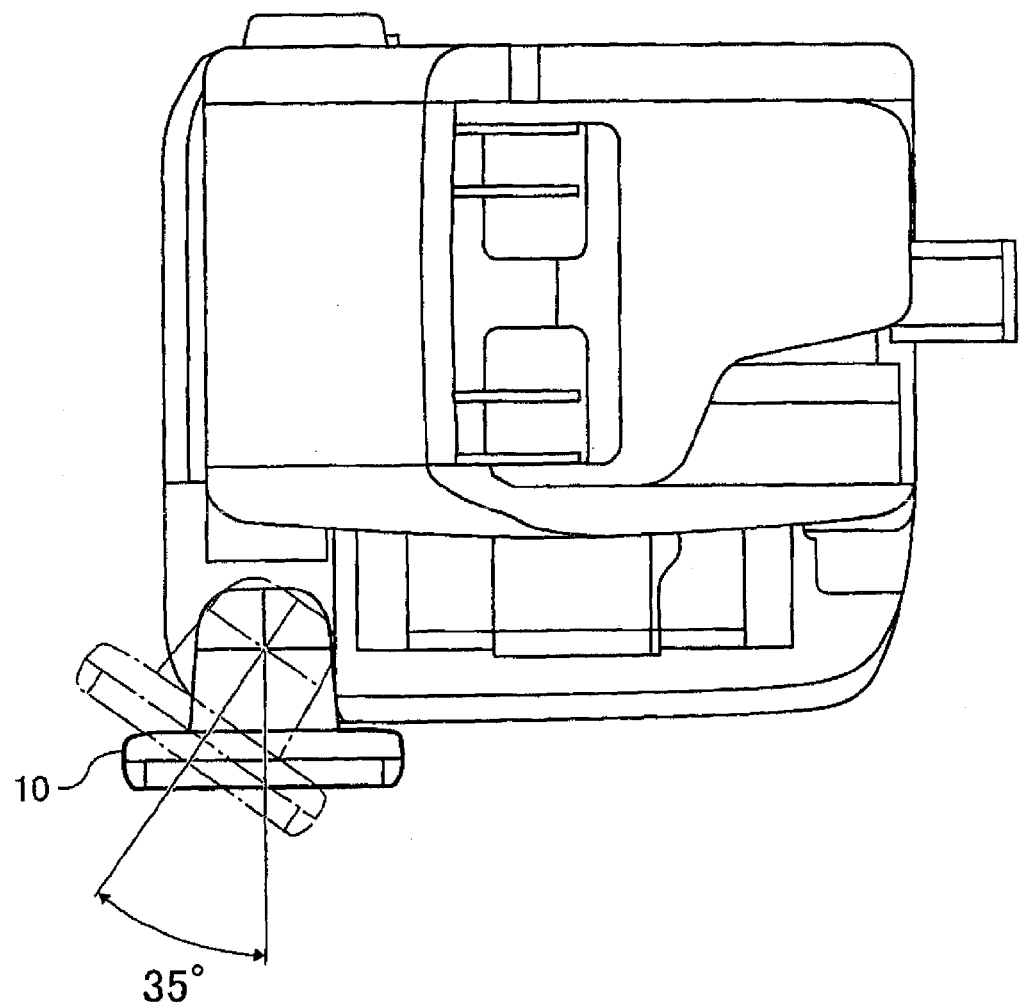
FIG. 4 is a top view showing a horizontal rotatable range of the operating panel 10.

The hinge mechanism according to the exemplary embodiment supports the operating panel 10 in such a manner that the operating panel 10 is rotatable independently about two axes that extend in a horizontal direction and the vertical direction, respectively. More specifically, in the exemplary embodiment, the operating panel 10 is supported so as to be tiltable (i.e., rotated in a vertical plane) by a maximum of 60° with respect to the vertical direction (see FIG. 3) and to be rotated in a horizontal plane by up to 35° leftward from the front direction (FIG. 4).

Figure 5:
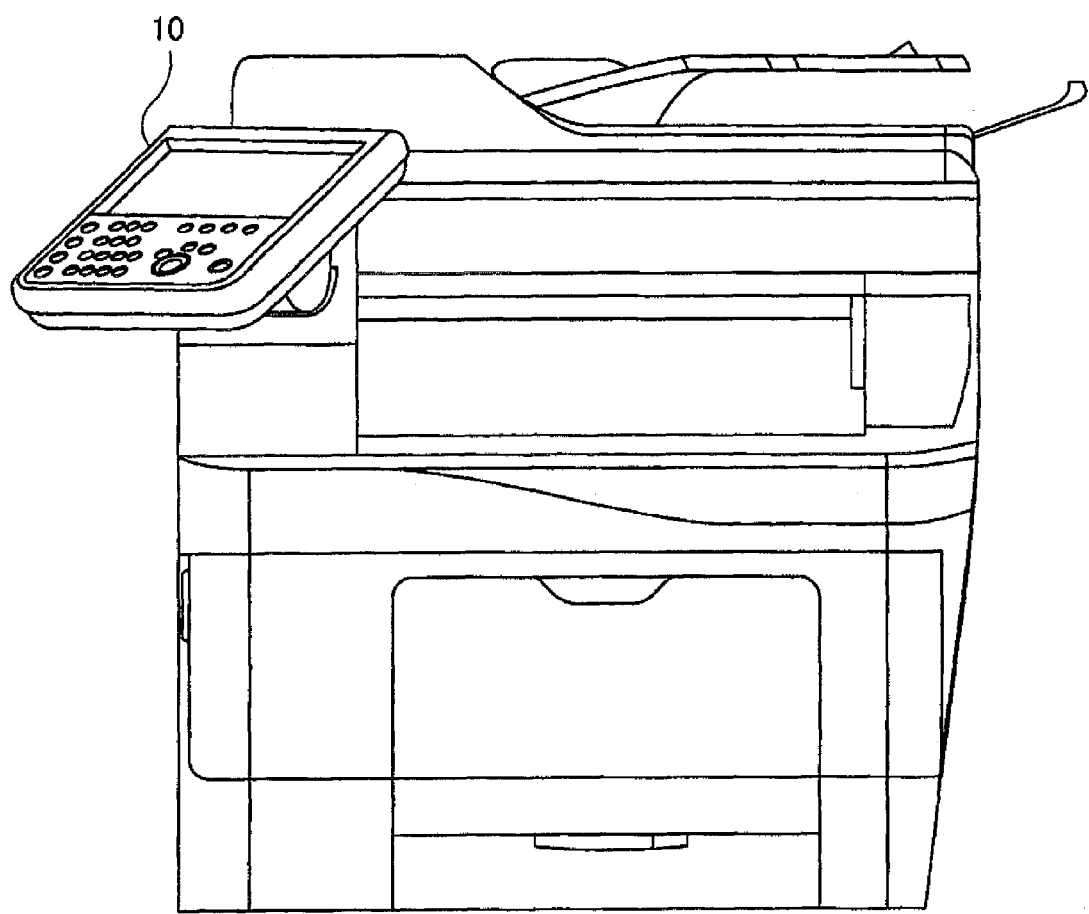
FIG. 5 shows an example posture that the operating panel 10 can assume because of its being supported by the hinge mechanism so as to be rotatable independently about two respective axes extending in a horizontal direction and the vertical direction.

Thus, the operating panel 10, which is supported by the hinge mechanism so as to be rotatable independently about the two respective axes extending in a horizontal direction and the vertical direction, can be rotated so as to assume, for example, a posture as shown in FIG. 5.

Figure 6:
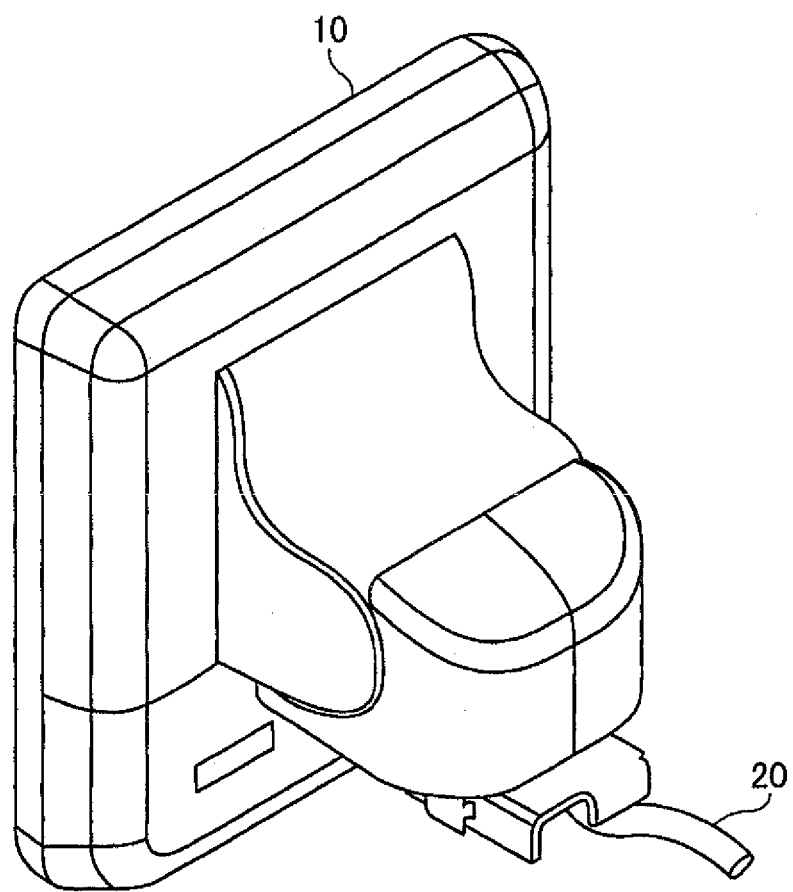
FIG. 6 is a perspective view showing an appearance of the operating panel 10 that is removed from the image forming apparatus.
Figure 7:
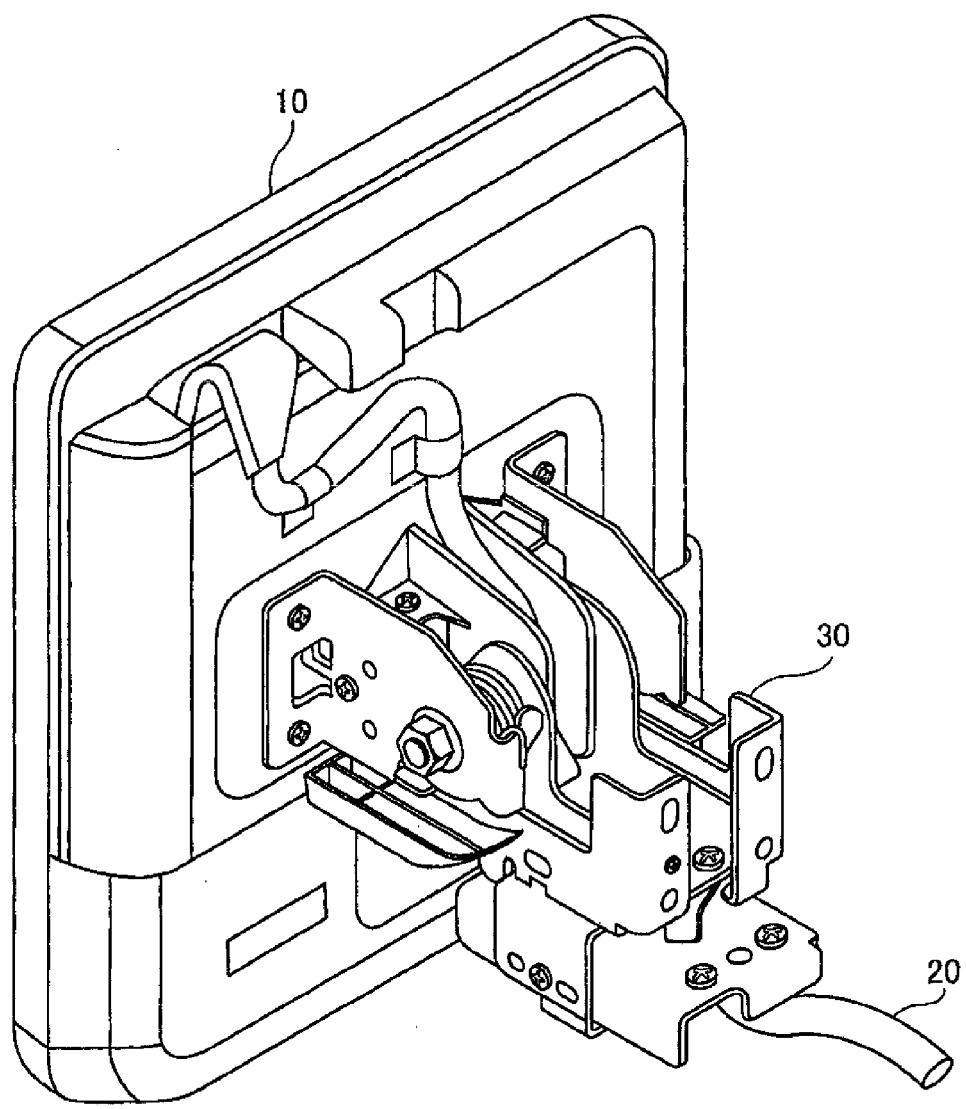
FIG. 7 is a perspective view showing an appearance of the operating panel 10 in which unlike in FIG. 6 a cover of the hinge mechanism is removed.

FIG. 6 shows an appearance of the operating panel 10 that is removed from the image forming apparatus. FIG. 6 is drawn in such a manner that a wire harness 20 (i.e., a bundle of cables) which connects the operating panel 10 to the main body of the image forming apparatus electrically is cut halfway. FIG. 6 does not show any appearance of the hinge mechanism because it is covered a cover. FIG. 7 shows an appearance of the operating panel 10 with the cover of the hinge mechanism removed. It is seen from FIG. 7 how the operating panel 10 is supported by the hinge mechanism 30.

Next, a detailed configuration of the hinge mechanism 30 will be described with reference to FIGS. 8-25. The wire harness 20 which connects the operating panel 10 to the main body of the image forming apparatus electrically is omitted in FIG. 8.

Figure 8:
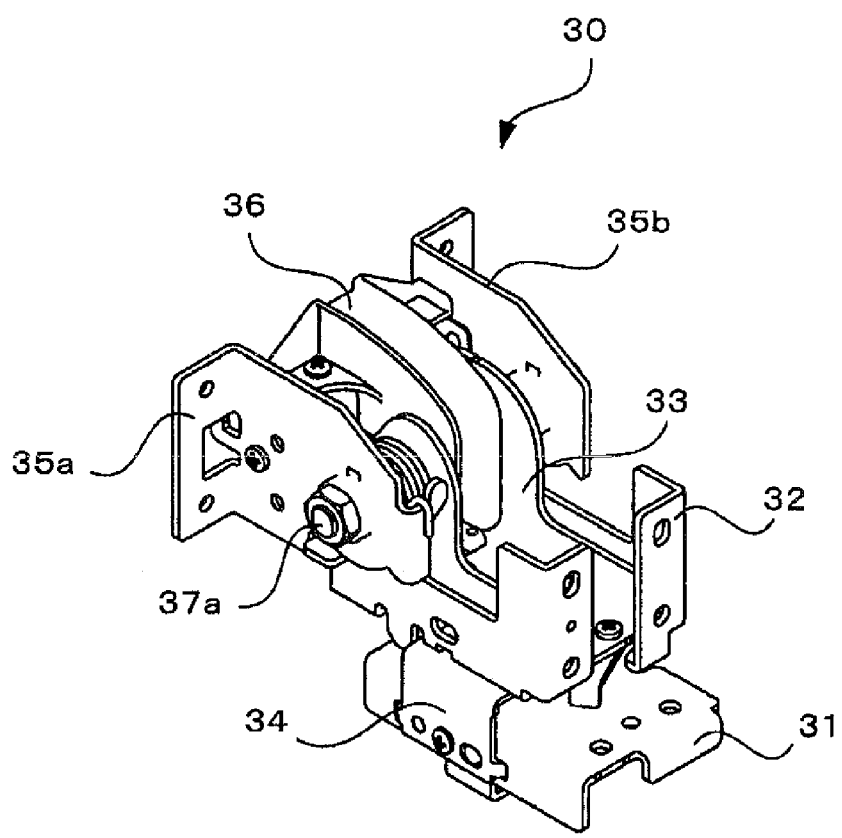
FIG. 8 is a perspective view showing a detailed configuration of the hinge mechanism 30 according to the exemplary embodiment of the invention.

As shown in FIG. 8, the hinge mechanism 30 according to the exemplary embodiment has a pedestal 31, an outer chassis 32, an inner chassis 33, a rotation stopper 34, panel fixing members 35a and 35b, a harness guide 36, tilt shaft structures (vertical rotation shaft structures) 37a and 37b, and a front plate 38. In FIG. 8, the tilt shaft structure 37b and the front plate 38 are not seen because they are hidden behind other components.

Figure 9:
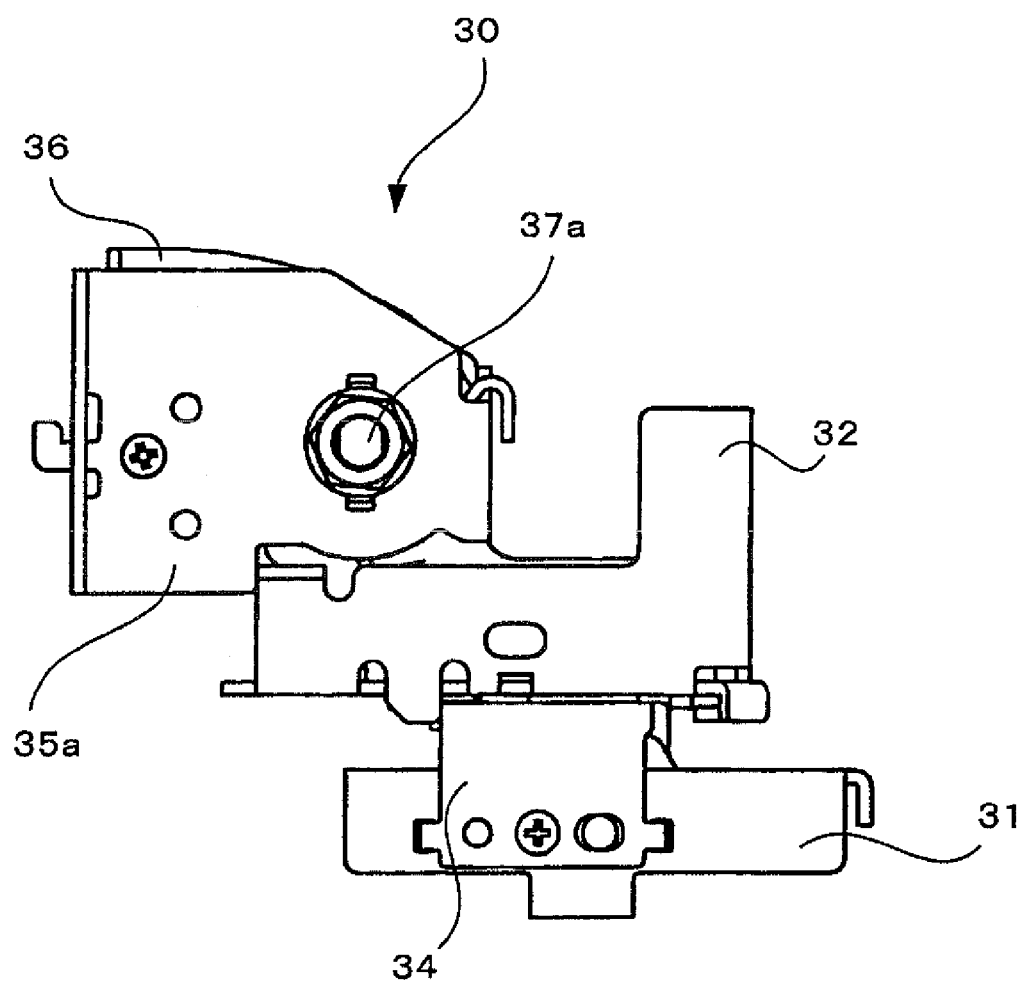
FIG. 9 is a side view of the hinge mechanism 30 shown in FIG. 8.
Figure 10:
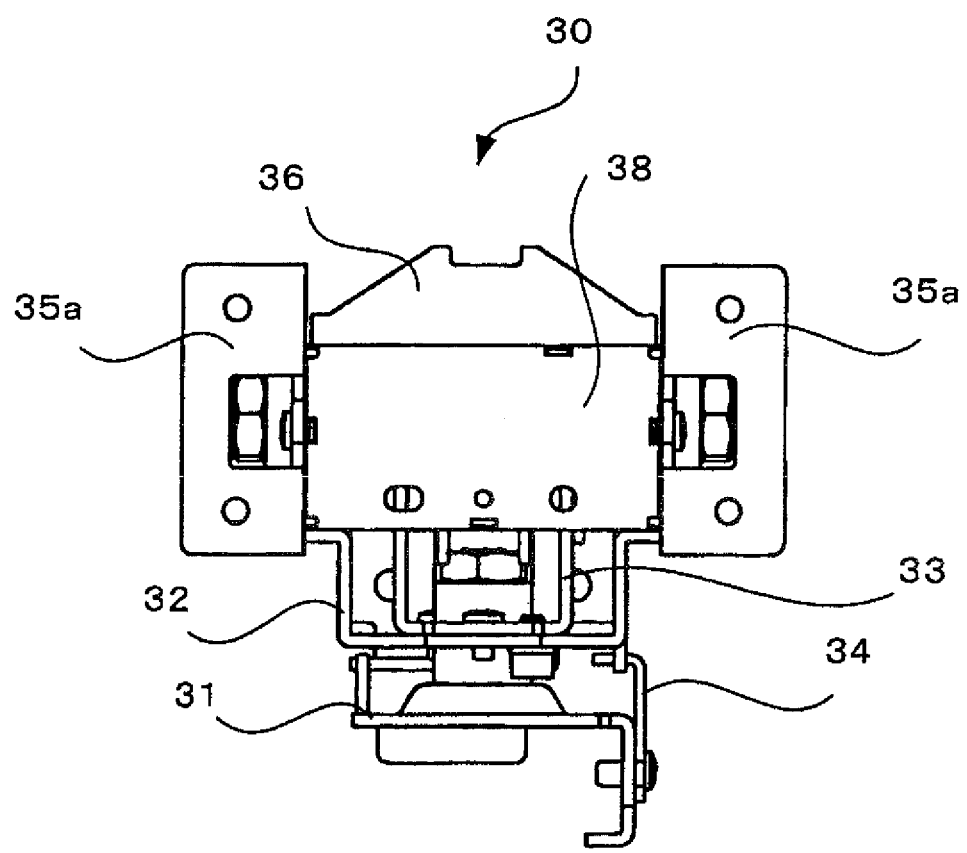
FIG. 10 is a front view of the hinge mechanism 30 shown in FIG. 8.
Figure 11:
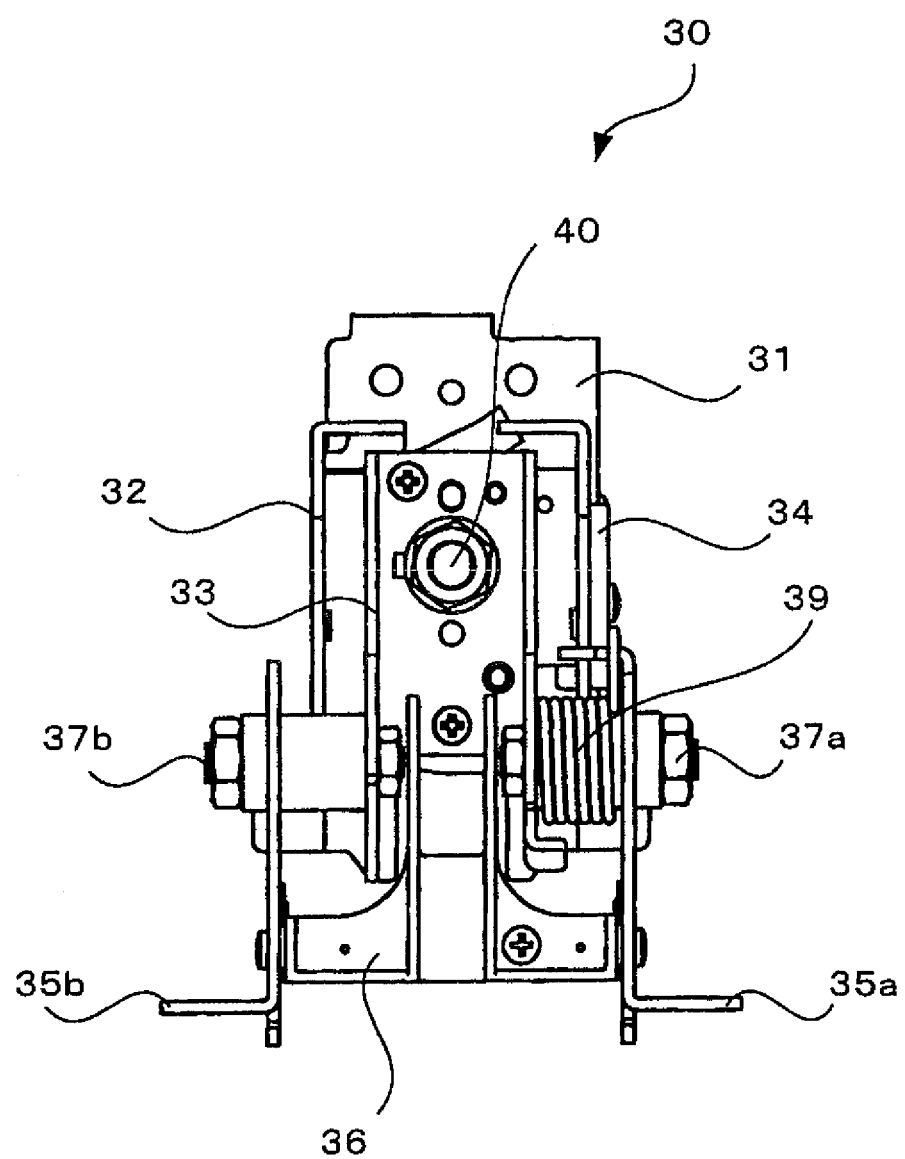
FIG. 11 is a top view of the hinge mechanism 30 shown in FIG. 8.

FIGS. 9, 10, and 11 are a side view, a front view, and a top view of the hinge mechanism 30, respectively.

The hinge mechanism 30 according to the exemplary embodiment has a first support member which supports the operating panel 10 (support subject unit) in a horizontal plane (in a first direction) and a second support member which supports the operating panel 10 in a vertical plane (in a second direction). The pedestal 31, the outer chassis 32, and the inner chassis 33 constitute the first support member and the panel fixing members 35a and 35b, the tilt shaft structures (vertical rotation shaft structures) 37a and 37b, and the front plate 38 constitute the second support member.

The pedestal 31, which is a component that attaches the hinge mechanism 30 to the main body of the image forming apparatus, is provided with a swivel shaft 40 (horizontal rotation shaft) for allowing rotation of the operating panel 10 in a horizontal plane. The inner chassis 33 and the outer chassis 32 which is disposed so as to cover the inner chassis 33 from outside are fastened together to the swivel shaft 40 and thereby supported by the pedestal 31.

The rotation stopper 34 has a function of restricting the horizontal rotatable range of the operating panel 10 and is detachable from the main body of the hinge mechanism 30. The rotatable range restricting function using the rotation stopper 34 will be described later in detail.

The panel fixing members 35a and 35b, which are holding members which hold the operating panel 10, are fixed to the front panel 38 sandwiched between them and are also fixed to the operating panel 10 with screws or the like.

The inner chassis 33 has two parallel side plates. The tilt shaft structure 37a is formed between one side plate of the inner chassis 33 and the panel fixing member 35a, and connects them so that they are rotatable with respect to each other. The tilt shaft structure 37b is formed between the other side plate of the inner chassis 33 and the panel fixing member 35b, and connects them so that they are rotatable with respect to each other. The tilt shaft structures 37a and 37b share the same axis. That is, inner chassis 33 holds the tilt shaft structures 37a and 37b for allowing tilting of the operating panel 10.

The harness guide 36 is disposed between the two parallel side plates of the inner chassis 33. The harness guide 36 functions as a protective member for protecting the wire harness 20 which connects the operating panel 10 to the main body of the image forming apparatus electrically so that the wire harness 20 is not brought into direct contact with the inner chassis 33.

Figure 12:
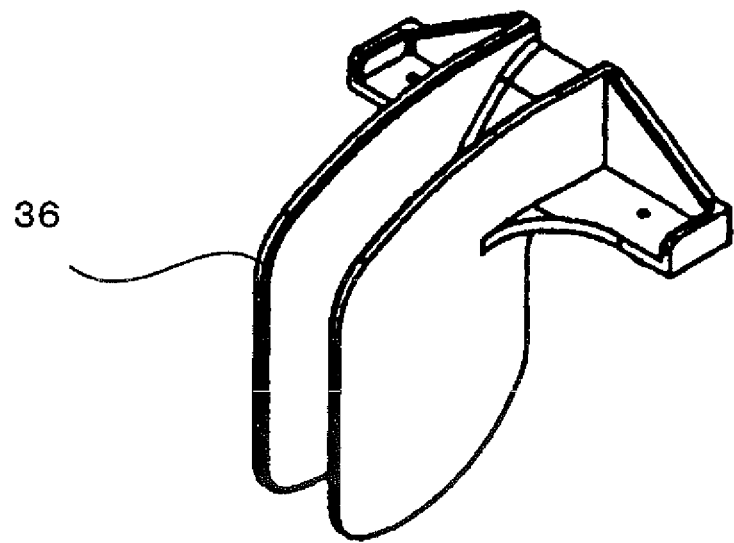
FIG. 12 a perspective view showing an appearance of a harness guide 36.
Figure 13:
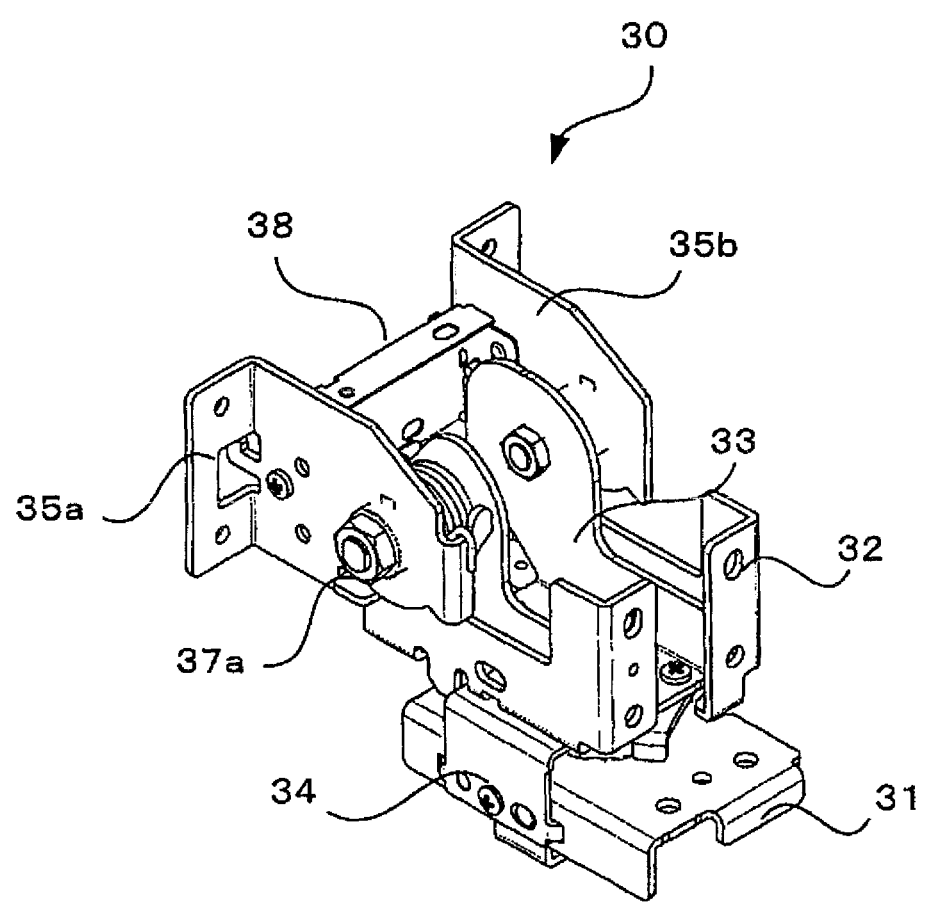
FIG. 13 is a perspective view of the hinge mechanism 30 according to the exemplary embodiment in which unlike in FIG. 8 the harness guide 36 is removed.

FIG. 12 shows an appearance of the harness guide 36. Made of resin, the harness guide 36 protects the wire harness 20 so that it can pass through the space defined by the tilt shaft structures 37a and 37b and the operating panel 10. FIG. 13 is a perspective view of the hinge mechanism 30 according to the exemplary embodiment in which unlike in FIG. 8 the harness guide 36 is removed.

Figure 14:
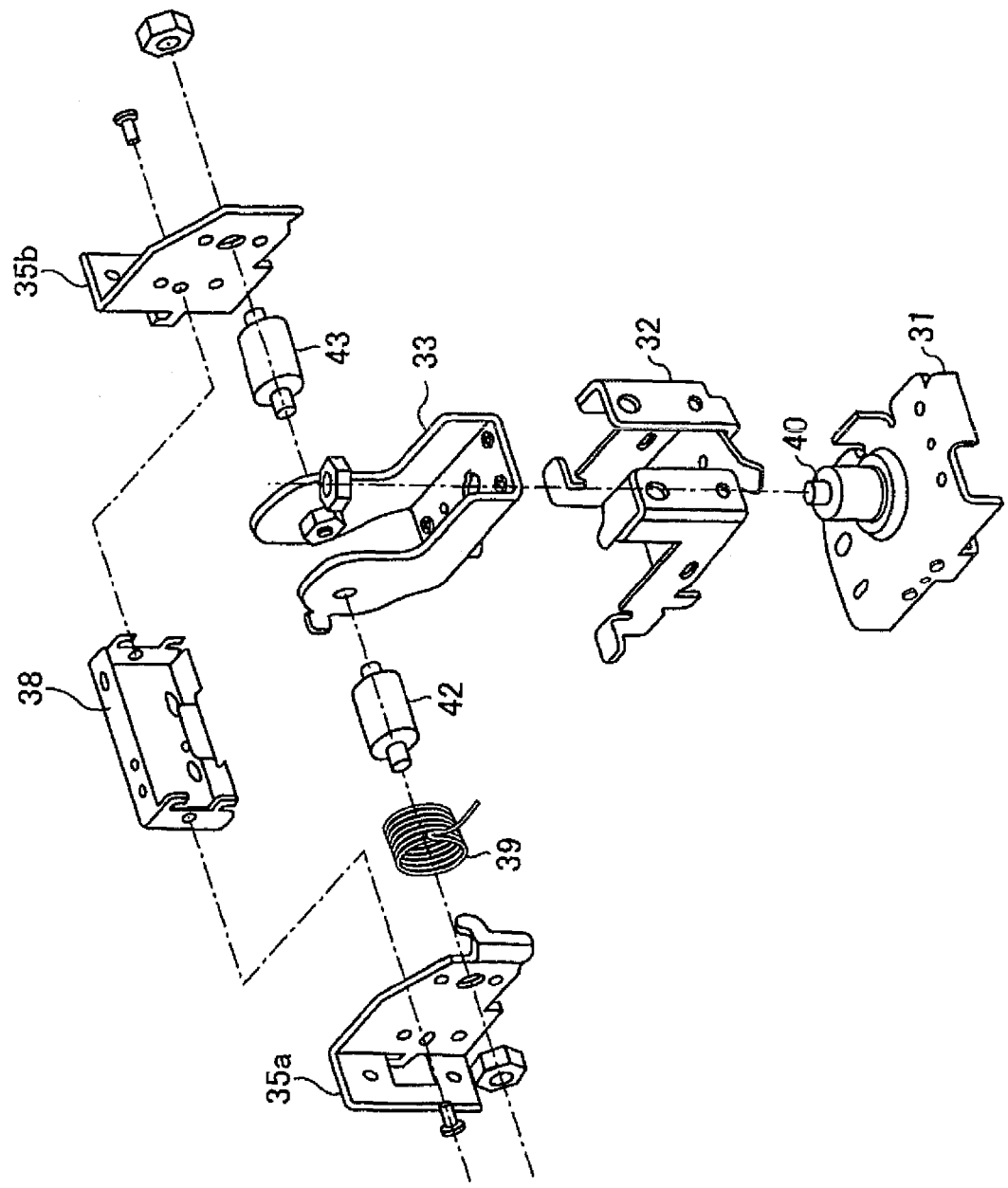
FIG. 14 is an exploded perspective view of the hinge mechanism 30 according to the exemplary embodiment.

FIG. 14 is an exploded perspective view of the hinge mechanism 30 according to the exemplary embodiment. The harness guide 36 and the rotation stopper 34 are omitted in FIG. 14. It is seen from FIG. 14 that the tilt shaft structure 36a is configured in such a manner that a spring 39 and a rotation shaft 42 are inserted between the panel fixing member 35a and the inner chassis 33 and the rotation shaft 42 is fixed to nuts or the like, and that the tilt shaft structure 36a is configured in such a manner that a rotation shaft 44 are inserted between the panel fixing member 35*b* and the inner chassis 33 and the rotation shaft 43 is fixed to nuts or the like.

[Horizontal Rotatable Range Restricting Function]

Next, the rotatable range restricting function using the rotation stopper 34 will be described in detail.

With the hinge mechanism 30 according to the exemplary embodiment, as shown in FIG. 4, for ordinary users of the image forming apparatus, the horizontal rotatable range of the operating panel 10 is restricted to the range from the front direction to the direction that is rotated by 35° leftward from the front direction. In a state that the rotation stopper 34 is removed from the hinge mechanism 30, the horizontal rotatable range is increased to 94°. The reason for restricting the horizontal rotatable range in this manner is to prevent such a problem as the operating panel 10's being damaged as a result of interference with, for example, a component of the main body of the image forming apparatus or failing as a result of contact with a component of the main body of the image forming apparatus.

In the hinge mechanism 30 according to the exemplary embodiment, the rotation stopper 34 is a rotation control plate for restricting the horizontal rotatable range each of two projections of the outer chassis 32 which is part of the first support member comes into contact with it. The rotation stopper 34 is fixed to the main body of the hinge mechanism 30 with screws in a detachable manner.

As such, the rotation stopper 34 functions as a first rotatable range restricting unit for restricting the horizontal rotatable range of the operating panel 10. In a state that the rotation stopper 34 is removed, the horizontal rotatable range is restricted by a second rotatable range restricting unit, which will be described later in detail.

First, how the horizontal rotatable range is restricted with the rotation stopper 34 attached to the main body of the hinge mechanism 30 will be described with reference to FIGS. 15A and 15B and FIGS. 16A and 16B.

Figure 15A:
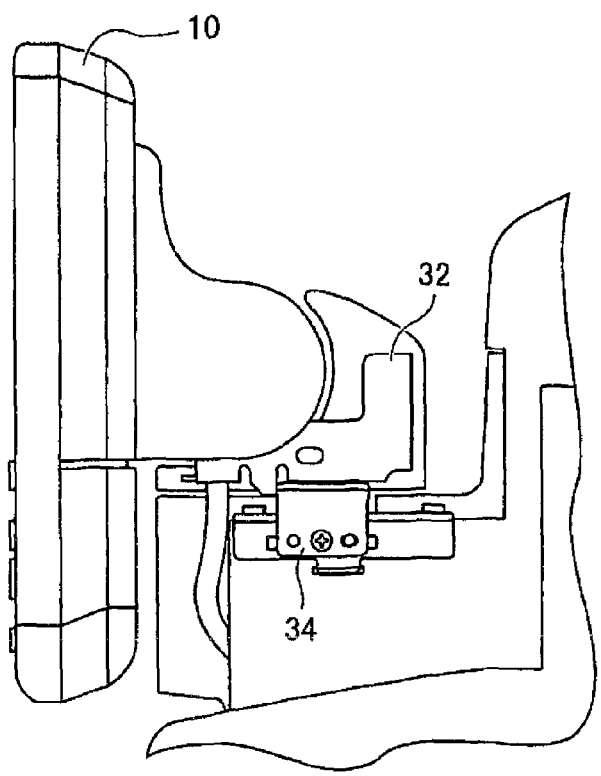
FIGS. 15A and 15B are side views showing how the horizontal rotatable range of the operating panel 10 is restricted with a rotation stopper 34 attached to the main body of the hinge mechanism 30.
Figure 15B:
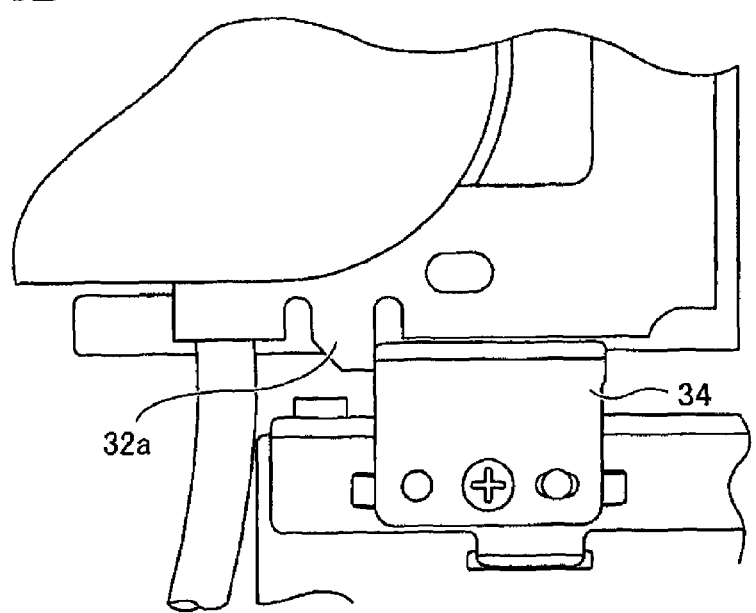

FIG. 15A shows a state that the rotation stopper 34 is attached to the main body of the hinge mechanism 30 and the operating panel 10 is directed to the front side and prevented from rotating rightward. FIG. 15B is an enlarged view of the rotation stopper 34 and its vicinity. It is seen from FIG. 15B that the rightward rotation of the operating panel 10 is prevented because a projection 32*a* of the outer chassis 32 is in contact with the rotation stopper 34.

Figure 16A:
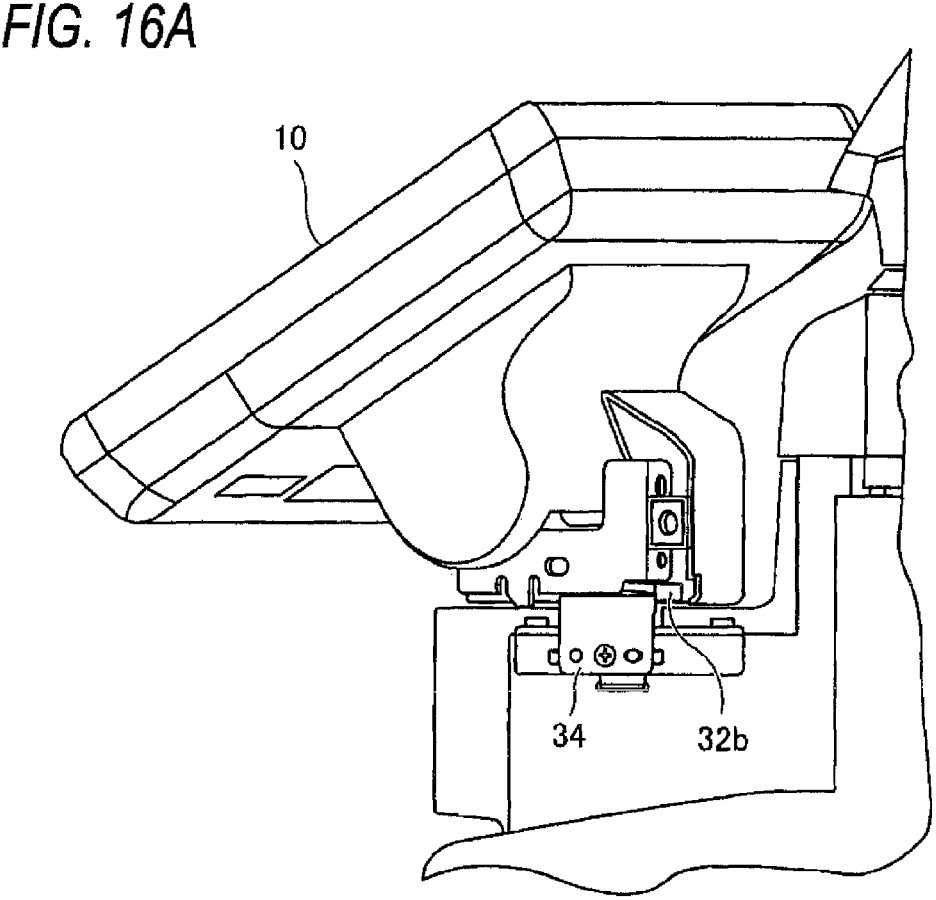
FIGS. 16A and 16B are other side views showing how the horizontal rotatable range of the operating panel 10 is restricted with the rotation stopper 34 attached to the main body of the hinge mechanism 30.
Figure 16B:
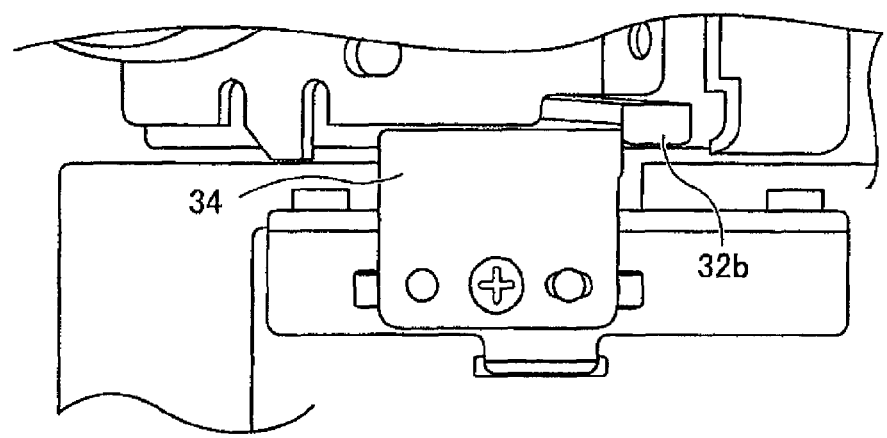

FIG. 16A shows a state that the rotation stopper 34 is attached to the main body of the hinge mechanism 30 and the operating panel 10 is prevented from rotating leftward past the position that is deviated leftward by 35° from the front direction. FIG. 16B is an enlarged view of the rotation stopper 34 and its vicinity. It is seen from FIG. 16B that the leftward rotation of the operating panel 10 is prevented because another projection 32*b* of the outer chassis 32 is in contact with the rotation stopper 34.

Next, how the horizontal rotatable range is restricted with the rotation stopper 34 removed from the main body of the hinge mechanism 30 will be described with reference to FIG. 17 to FIGS. 19A and 19B.

Figure 17:
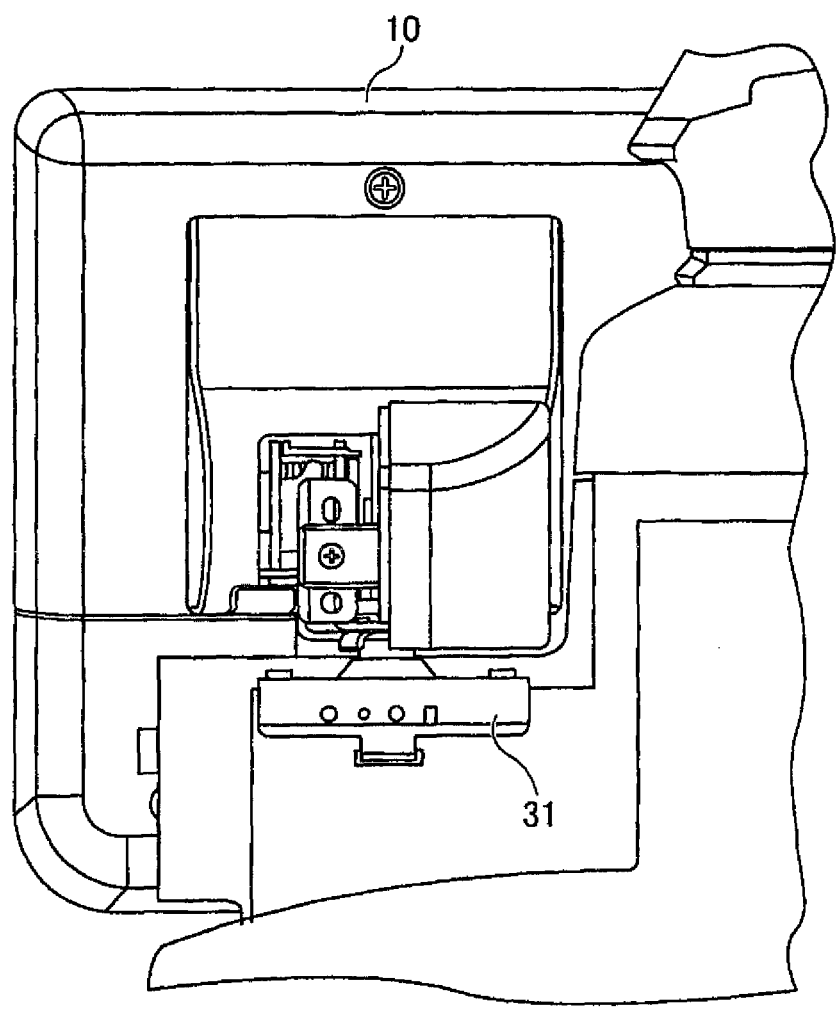
FIG. 17 is a side view showing a state that the rotation stopper 34 is removed from the main body of the hinge mechanism 30.
Figure 18A:
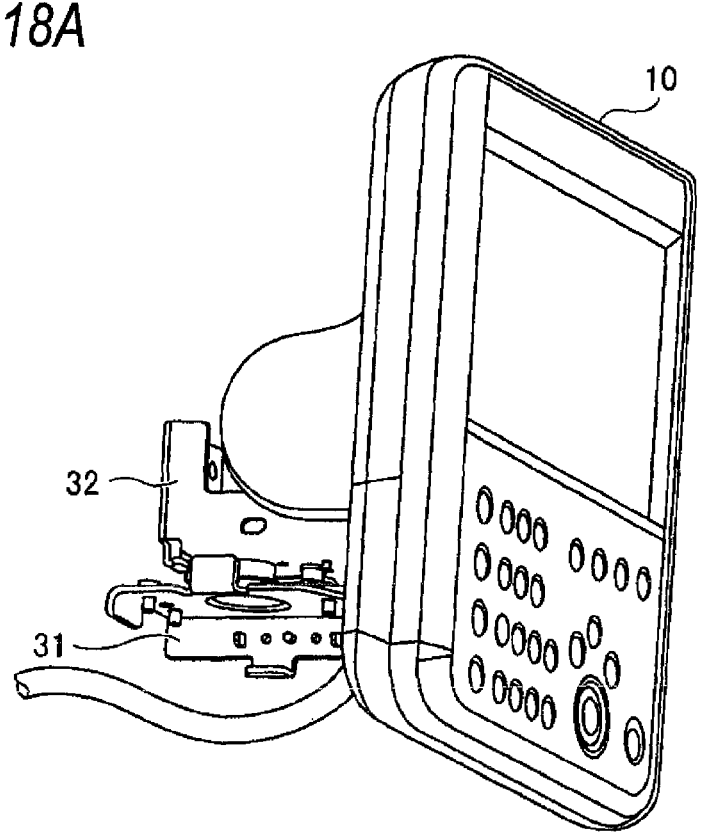
FIGS. 18A and 18B are side views in which the operating panel 10 is viewed from the side opposite to the side from which it is viewed in the case of FIG. 17.
Figure 18B:
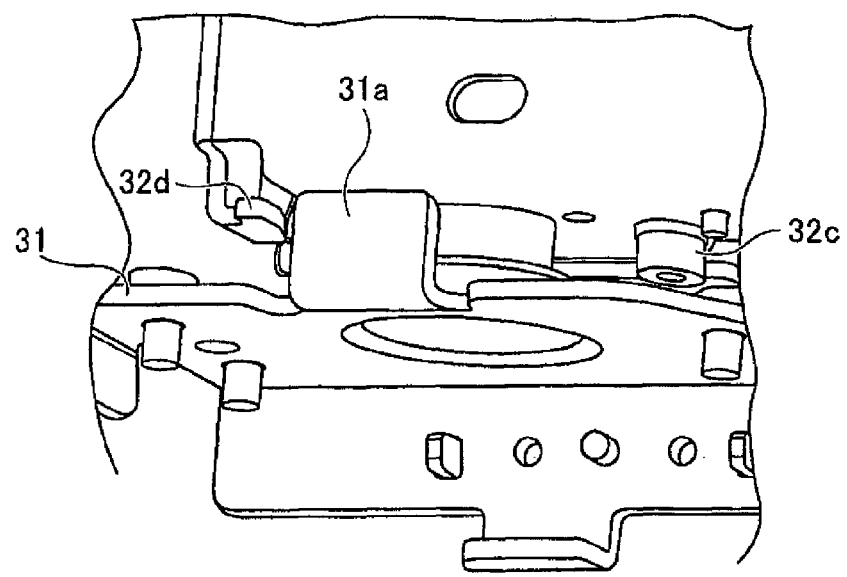

FIG. 17 shows a state that the rotation stopper 34 is removed from the main body of the hinge mechanism 30. FIG. 18A is a side view in which the operating panel 10 is viewed from the side opposite to the side from which it is viewed in the case of FIG. 17. FIG. 18B is an enlarged side view of part of FIG. 18A, that is, the pedestal 31 and the outer chassis 32 and their vicinity. It is seen from FIG. 18B that the pedestal 31 is formed with a stopper 31*a* and the outer chassis 32 is formed with projections 32*c* and 32*d*. In this exemplary embodiment, the projection 32*c* is the head of a screw.

The stopper 31*a* and the projections 32*c* and 32*d* function as the second rotatable range restricting unit for restricting the horizontal rotatable range of the operating panel 10 to a wider range in the case where the rotation stopper 34 which is the first rotatable range restricting unit is removed from the main body of the hinge mechanism 30.

Figure 19A:
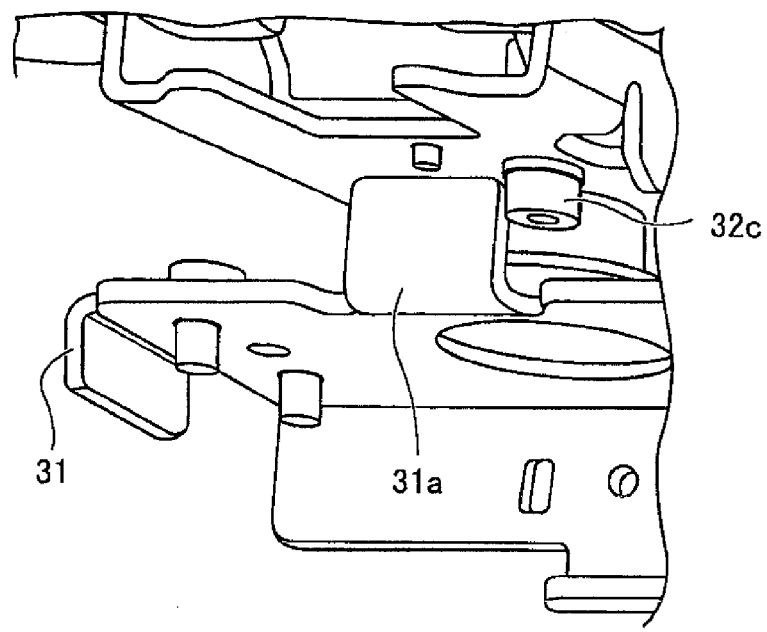
FIGS. 19A and 19B are perspective views showing states that projections 32c and 32d of an outer chassis 32 is in contact with a stopper 31a, respectively.
Figure 19B:
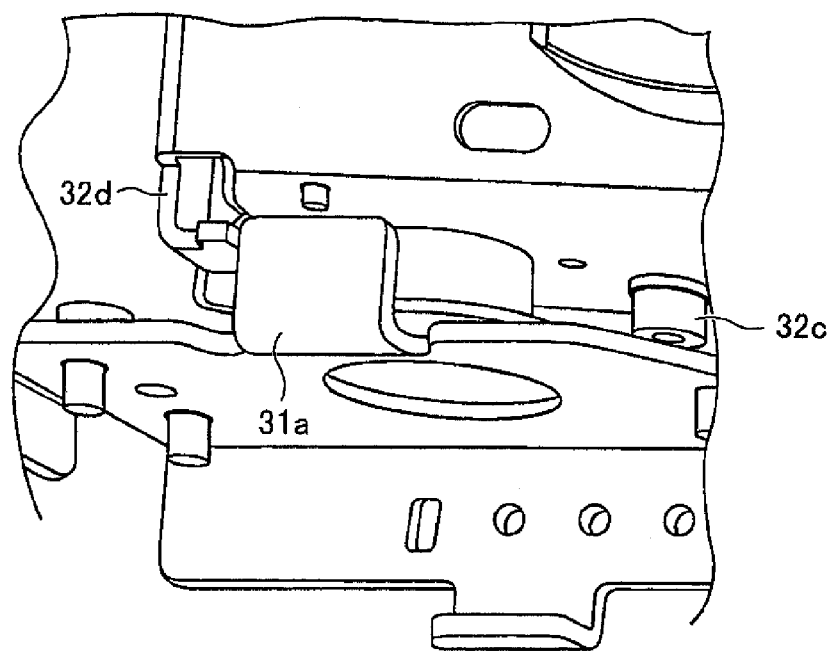
Figure 20:
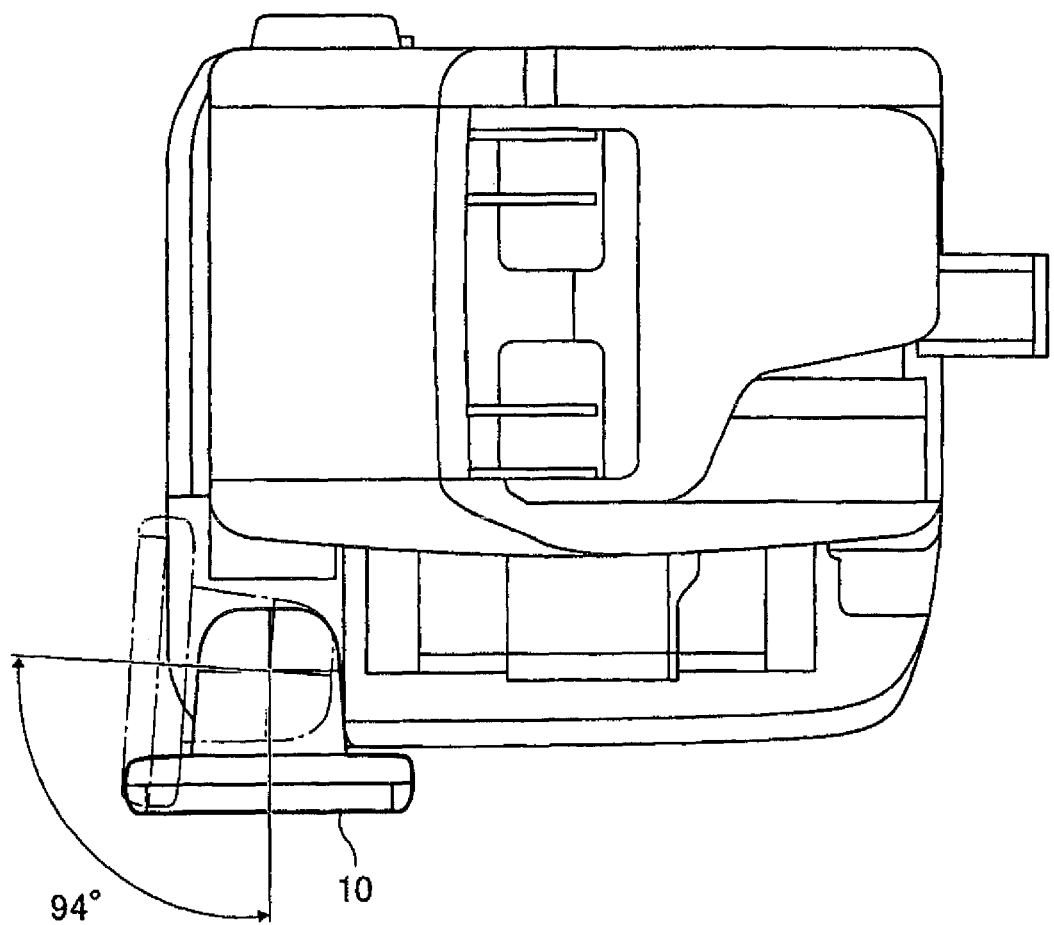
FIG. 20 is a top view showing a horizontal rotatable range of the operating panel 10 in a state that the rotation stopper 34 is removed.

FIG. 19A shows a state that the projection 32*c* of the outer chassis 32 is in contact with the stopper 31*a*. FIG. 19B shows a state that the projection 32*d* of the outer chassis 32 is in contact with the stopper 31*a*. The horizontal rotatable range of the operating panel 10 is restricted depending on the positions of the projections 32*c* and 32*d* in the outer chassis 32. In the exemplary embodiment, in a state that the rotation stopper 34 is removed, as shown in FIG. 20, the horizontal rotatable range is restricted so that the operating panel 10 is rotatable in the range from the front direction to the direction that is rotated by 94° leftward from the front direction.

The rotation stopper 34 which is the first rotatable range restricting unit is disposed at such a position that ordinary users of the image forming apparatus incorporating the hinge mechanism 30 cannot remove it and only service technicians who maintain and inspect the image forming apparatus can.

That is, the hinge mechanism 30 is configured so that whereas the horizontal rotatable range of the operating panel 10 is narrow for ordinary users, driver routes and work areas that are necessary in removing screws etc. used at the back side of the operating panel 10 can be secured (see FIG. 20) for service technicians who maintain and inspect the image forming apparatus.

[Increase of Rigidity Relative to Swivel Shaft 40]

Figure 21:
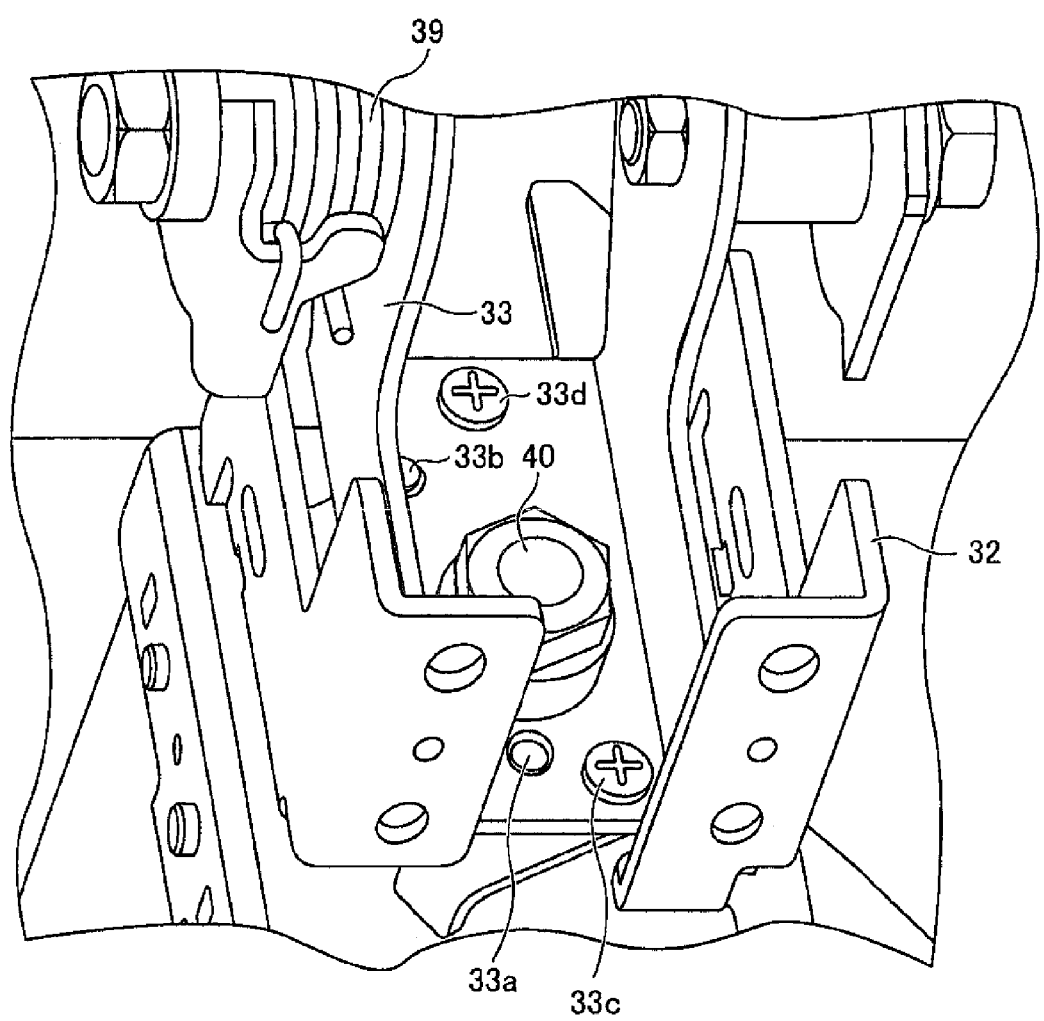
FIG. 21 is an enlarged perspective view showing a swivel shaft 40 and its neighborhood of the hinge mechanism 30 according to the exemplary embodiment of the invention.

Next, a description will be made of increase of the rigidity relative to the swivel shaft 40 in the hinge mechanism 30 according to the exemplary embodiment. FIG. 21 is an enlarged perspective view showing the swivel shaft 90 and its neighborhood of the hinge mechanism 30 according to the exemplary embodiment. It is seen from FIG. 21 that as mentioned above the inner chassis 33 and the outer chassis 32 which is disposed so as to cover the inner chassis 33 from outside are fastened together to the swivel shaft 40 and thereby supported by the pedestal 31.

The outer chassis 32 is provided with bosses (projections) for positioning between itself and the inner chassis 33, and boss holes 33*a* and 33*b* are formed through the inner chassis 33 at positions corresponding to the positions of the respective bosses. The inner chassis 33 and the outer chassis 32 can be fixed to each other temporarily with screws 37*c* and 37*d*. That is, the inner chassis 33 is configured so as to be able to be fixed to the outer chassis 32 in such a state as to urge the spring 39 for giving manipulation loads to the tilt shaft structures 37*a* and 37*b*.

In assembling the hinge mechanism 30, first the inner chassis 33 and the outer chassis 32 are fixed to each other temporarily before being fixed to the swivel shaft 40. Then the inner chassis 33 and the outer chassis 32 that are fixed to each other temporarily are fastened together to the swivel shaft 40. This prevents lowering of the efficiency of assembling due to the dual structure consisting of the inner chassis 33 and the outer chassis 32.

In the hinge mechanism 30 according to the exemplary embodiment, as described above, since the inner chassis 33 and the outer chassis 32 are fastened together to the swivel shaft 40 to provide the dual bottom structure, the their rigidity relative to the swivel shaft 40 is higher than in the case of a single bottom structure. As a result, the degree of fluctuation that occurs when the operating panel 10 is manipulated is reduced, whereby a comfortable manipulation is realized.

In addition, unlike in a case that the inner chassis 33 and the outer chassis 32 are implemented as a single chassis having a double plate thickness, the structure of the exemplary embodiment in which the rigidity is increased using the inner chassis 33 and the outer chassis 32 can prevent increase in the weight of components concerned and resulting cost increase.

Furthermore, since the opening of the outer chassis 32 that is seen when viewed from the one side is closed partially by the inner chassis 33, the strength of the hinge mechanism 30 as a whole is increased.

The outer chassis 32 is formed with the projections for restricting the horizontal rotatable range of the operating panel 10, as well as screw holes or the like for fixing of a cover (cover member) for covering the hinge mechanism 30. The inner chassis 33 supports the tilt shaft structures 37a and 37b for tilting the operating panel 10.

Since as described above the outer chassis 32 and the inner chassis 33 are in charge of the different functions, even if, for example, the outer chassis 32 is distorted when an unexpectedly large external force acts on the operating panel 10, this does not affect the tilting function of the inner chassis 33 and hence the operating panel 10 can be tilted normally.

[Wiring of Wire Harness 20]

Figure 22:
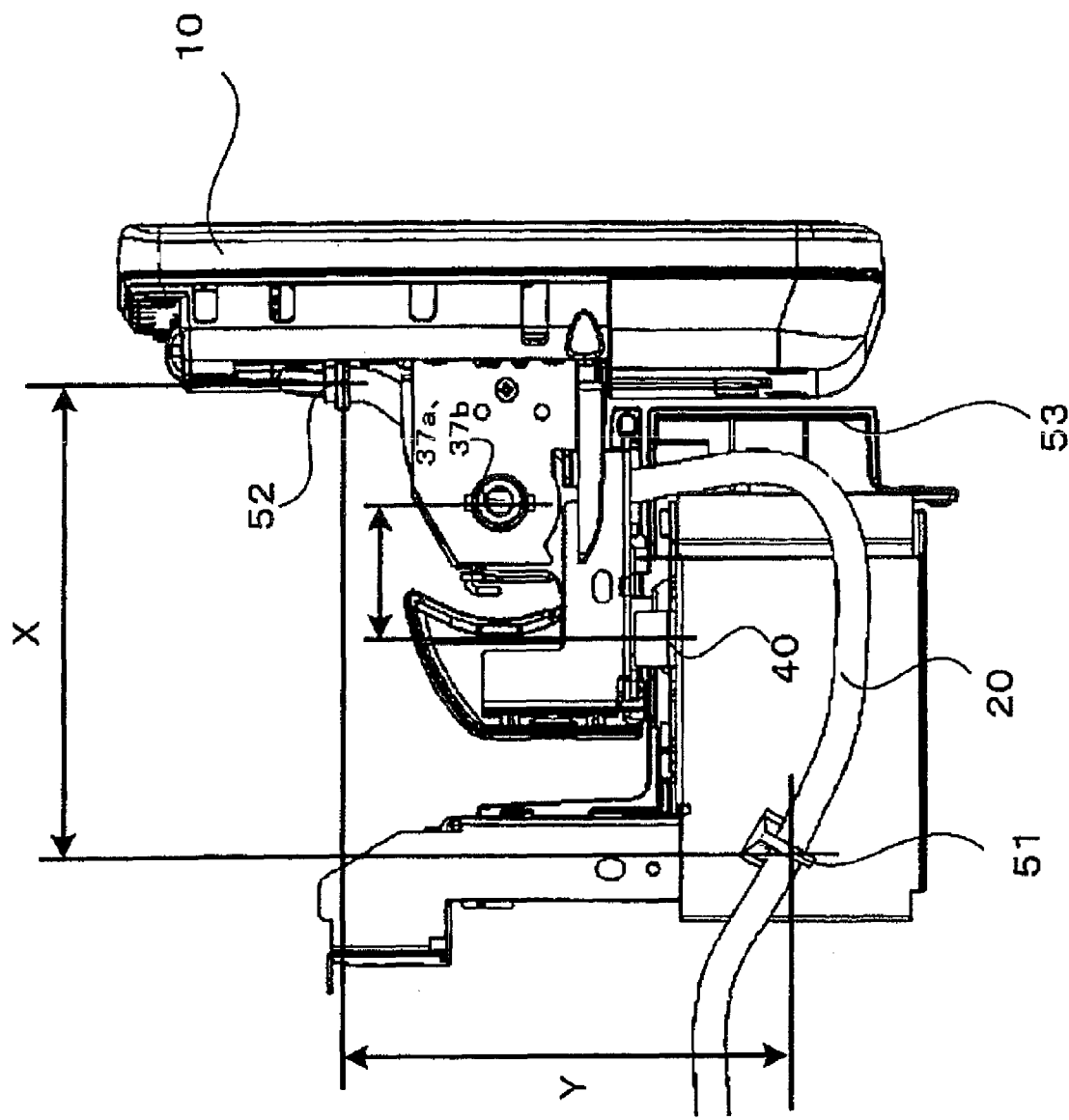
FIG. 22 is a side view showing how a wire harness 20 for connection between the operating panel 10 and the main body of the image forming apparatus is wound.
Figure 23:
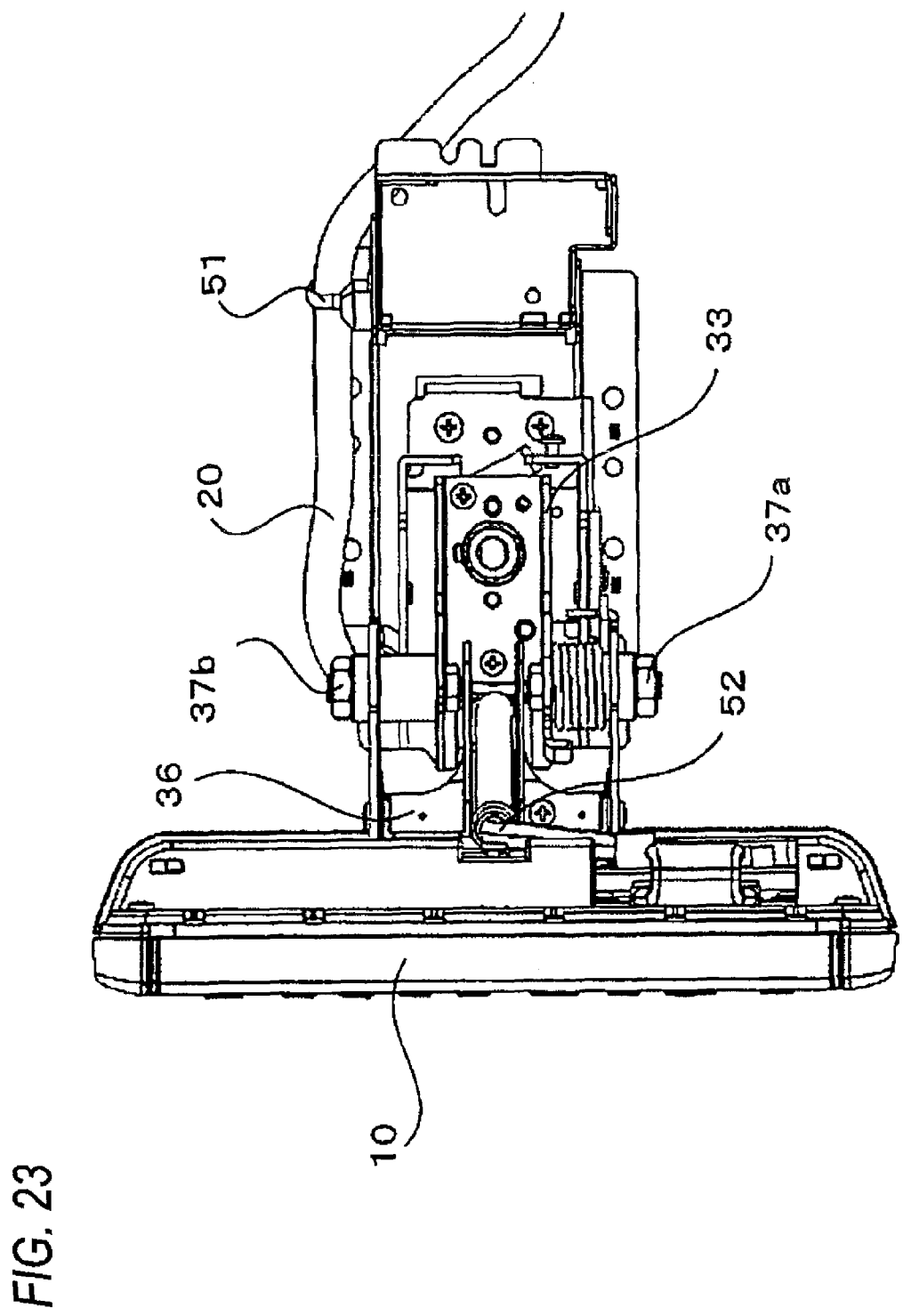
FIG. 23 is a top view corresponding to FIG. 21.

Next, a description will be made of how the wire harness 20 is wound in the hinge mechanism 30 according to the exemplary embodiment. FIG. 22 is a side view showing how the wire harness 20 for connection between the operating panel 10 and the main body of the image forming apparatus is wound. FIG. 23 is a top view corresponding to FIG. 21.

The wire harness 20 is fixed (clamped) to the frame of the image forming apparatus at a fixing point 51 and fixed to the operating panel 10 at a fixing point 52. While being protected by the harness guide 36 of the hinge mechanism 30, the wire harness 20 passes through the space defined by the tilt shaft structures 37a and 37b and the operating panel 10, goes down straightly in the hinge mechanism 30, then droops to some extent, and finally fixed to the image forming apparatus at the fixing point 51.

A front cover 53 is disposed in front of part of the wire harness 20 so that part of the wire harness 20 is not seen by a user. The wire harness 20 droops behind the front cover 53.

As shown in FIGS. 22 and 23, the tilt shaft structures 37a and 37b are located on the front side of the swivel shaft 40. That is, the tilt shaft structures 37a and 37b are located between the swivel shaft 40 and the operating panel 10 holding position. This structure secures a path along which the wire harness 20 goes down straightly.

Although not shown in any drawings, the pedestal 31 is cut according to the horizontal rotation locus of the operating panel 10, whereby a movement space for a movement that the wire harness 20 makes when the operating panel 10 is moved in a horizontal plane is secured and the wire harness 20 is prevented from coming into contact with the pedestal 31 and being thereby broken.

Since the horizontal distance X between the fixing points 51 and 52 is set longer than their vertical distance Y, the portion, drooping behind the front cover 53, of the wire harness 20 plays downward in the vertical direction. Therefore, even if the wire harness 20 is bent to a larger extent when the operating panel 10 is tilted, it is bent more downward in the vertical direction than toward the front cover 53. Therefore, even when the operating panel 10 is tilted, the probability of occurrence of such a problem as the wire harness 20's hitting the front cover 53 and thereby being damaged or broken is low.

Figure 24:
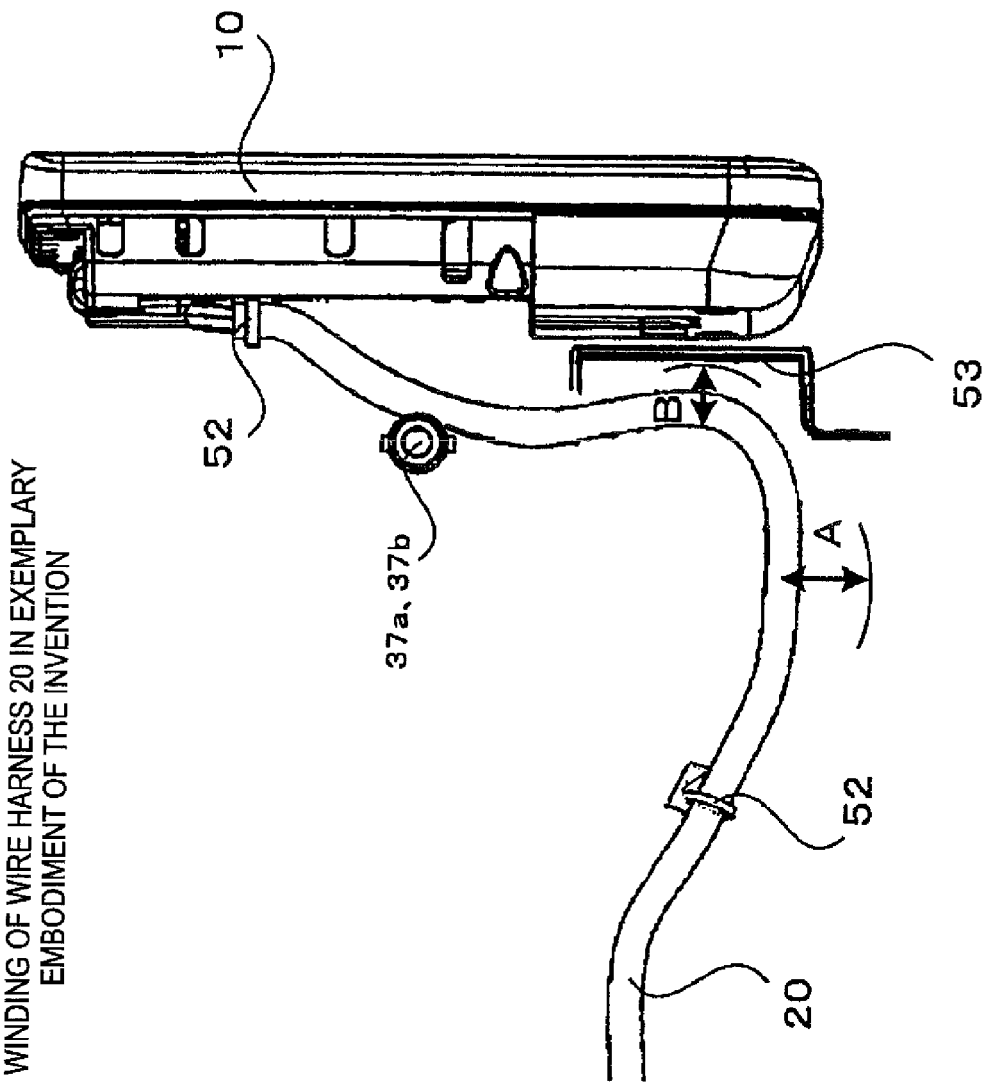
FIG. 24 is a side view showing the wiring of the wire harness 20 in the hinge mechanism 30 according to the exemplary embodiment of the invention in such a manner that the components irrelevant to the positional relationships with tilt shaft structures 37a and 37b and a front cover 53 are omitted.

FIG. 24 shows the wiring of the wire harness 20 in the hinge mechanism 30 according to the exemplary embodiment in such a manner that the components irrelevant to its positional relationships with the tilt shaft structures 37a and 37b and the front cover 53 are omitted. It is seen from FIG. 24 that in the hinge mechanism 30 according to the exemplary embodiment goes along the path that is formed between the operating panel 10 and the tilt shafts 37a and 37b and hence goes down approximately straightly from the fixing point 52 on the operating panel 10.

In the hinge mechanism 30 according to the exemplary embodiment, since the wire harness 20 is wound in the above manner, even if the wire harness 20 is bent to a larger extent when the operating panel 10 is tilted, the resulting downward displacement A is larger than the resulting forward displacement B.

Figure 25:
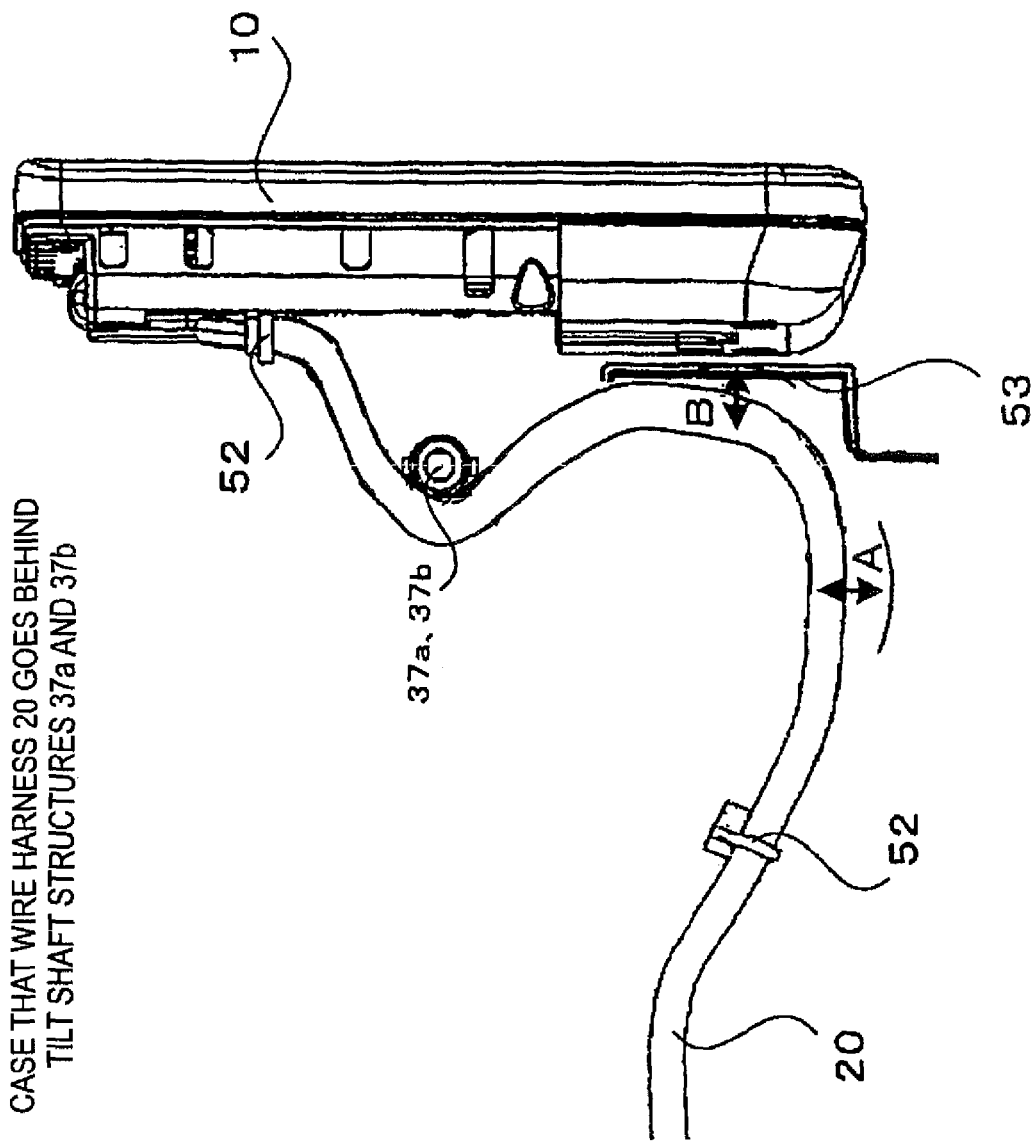
FIG. 25 shows a case that the wire harness 20 is wound so as to go behind the tilt shaft structures 37a and 37b.

FIG. 25 shows a case that the wire harness 20 is wound so as to go behind the tilt shaft structures 37a and 37b. It is seen from FIG. 25 that the wire harness 20 is bent more toward the front cover 53 because it goes behind the tilt shaft structures 37a and 37b. Therefore, in the winding shown in FIG. 25, when the wire harness 20 is bent to a larger extent as a result of tilting of the operating panel 10, the resulting forward displacement B is larger than the resulting downward displacement A. Therefore, when the operating panel 10 is tilted, it is highly probable that the wire harness 20 hits the front cover 53.

In the hinge mechanism 30 according to the exemplary embodiment, since the wire harness 20 goes along the harness path shown in FIG. 24 in the hinge mechanism 30, the wire harness 20 can be prevented from coming into contact with the front cover 53 even when the operating panel 10 is tilted, though the wire harness 20 goes from the operating panel 10 along a path that is closer to a straight line.

The above exemplary embodiment is directed to the case that the hinge mechanism 30 according to the exemplary embodiment is used to support the operating panel 10 of the image forming apparatus in a rotatable manner. However, the invention is not limited to such a case and can likewise be applied to a case that another type of support subject unit is supported by a hinge mechanism in a rotatable manner.

What is claimed is:

1. A rotational support mechanism comprising:
a fixing member that holds a support subject unit;
an inner chassis that supports the fixing member so that the fixing member is rotatable in a vertical plane via a tilt shaft structure that is formed between the fixing member and the inner chassis;
an outer chassis that is formed so as to cover the inner chassis from outside;
a pedestal that supports the inner chassis and the outer chassis so that the inner chassis and the outer chassis are rotatable in a horizontal plane via a swivel shaft that is formed between a combination of the inner chassis and the outer chassis and the pedestal; and
a first rotatable range restricting unit that is detachable and restricts a horizontal rotatable range of the support subject unit; and
a second rotatable range restricting unit that restricts the horizontal rotatable range of the support subject unit to a range that is wider than a range of the first rotatable range restricting unit in a state that the first rotatable range restricting unit is removed.

2. A rotational support mechanism comprising:
a fixing member that holds a support subject unit;
an inner chassis that supports the fixing member so that the fixing member is rotatable in a vertical plane via a tilt shaft structure that is formed between the fixing member and the inner chassis;
an outer chassis that is formed so as to cover the inner chassis from outside;
a pedestal that supports the inner chassis and the outer chassis so that the inner chassis and the outer chassis are rotatable in a horizontal plane via a swivel shaft that is formed between a combination of the inner chassis and the outer chassis and the pedestal; and
a first rotatable range restricting unit that is detachable and restricts a horizontal rotatable range of the support subject unit,
wherein the first rotatable range restricting unit is a rotation control plate that restricts the horizontal rotatable range in such a manner that each of two projections of the outer chassis comes into contact with the rotation control plate, and that is fixed to a main body of the rotational support mechanism detachably with screws.

3. The rotational support mechanism according to claim 1, wherein the first rotatable range restricting unit is a rotation control plate that restricts the horizontal rotatable range in such a manner that each of two projections of the outer chassis comes into contact with the rotation control plate, and that is fixed to a main body of the rotational support mechanism detachably with screws.

4. A rotational support mechanism comprising:
a fixing member that holds a support subject unit;
an inner chassis that supports the fixing member so that the fixing member is rotatable in a vertical plane via a tilt shaft structure that is formed between the fixing member and the inner chassis;
an outer chassis that is formed so as to cover the inner chassis from outside; and
a pedestal that supports the inner chassis and the outer chassis so that the inner chassis and the outer chassis are rotatable in a horizontal plane via a swivel shaft that is formed between a combination of the inner chassis and the outer chassis and the pedestal,
wherein the tilt shaft structure comprises a first tilt shaft structure that is formed between a first side plate of the inner chassis and the fixing member and a second tilt shaft structure that is formed between a second side plate of the inner chassis and the fixing member, and
wherein the rotational support mechanism further comprises a protective member that is disposed between the first side plate and the second side plate, and protects a bundle of cables for electrical connection of the support subject unit so that the bundle of cables does not come into contact with the inner chassis.

5. The rotational support mechanism according to claim 4, wherein the protective member protects the bundle of cables in such a manner that it can pass between the support subject unit and the tilt shaft structure.

6. The rotational support mechanism according to claim 4, wherein the protective member is made of resin.

7. The rotational support mechanism according to claim 5, wherein the protective member is made of resin.

8. The rotational support mechanism according to claim 4, wherein the tilt shaft structure is located between the swivel shaft and the support subject unit.

9. The rotational support mechanism according to claim 5, wherein the tilt shaft structure is located between the swivel shaft and the support subject unit.

10. The rotational support mechanism according to claim 6, wherein the tilt shaft structure is located between the swivel shaft and the support subject unit.

11. The rotational support mechanism according to claim 7, wherein the tilt shaft structure is located between the swivel shaft and the support subject unit.

12. A rotational support mechanism comprising:
a fixing member that holds a support subject unit;
an inner chassis that supports the fixing member so that the fixing member is rotatable in a vertical plane via a tilt shaft structure that is formed between the fixing member and the inner chassis;
an outer chassis that is formed so as to cover the inner chassis from outside; and
a pedestal that supports the inner chassis and the outer chassis so that the inner chassis and the outer chassis are rotatable in a horizontal plane via a swivel shaft that is formed between a combination of the inner chassis and the outer chassis and the pedestal,
wherein the inner chassis and the outer chassis are fastened together to the swivel shaft, and
wherein the outer chassis is provided with projections that restrict a horizontal rotatable range of the support subject unit.

13. The rotational support mechanism according to claim 12, wherein the inner chassis is configured so as to be able to be fixed to the outer chassis in such a state as to urge an elastic member for giving a manipulation load to the tilt shaft structure.

14. The rotational support mechanism according to claim 12, wherein the outer chassis is provided with a structure for fixing, to itself, a cover member for covering the rotational support mechanism.

15. The rotational support mechanism according to claim 13, wherein the outer chassis is provided with a structure for fixing, to itself, a cover member for covering the rotational support mechanism.

* * * * *